(12) United States Patent
Ishikawa

(10) Patent No.: US 7,710,838 B2
(45) Date of Patent: May 4, 2010

(54) FOCUS OUT DETECTING APPARATUS AND OPTICAL DISC APPARATUS USING THE SAME

(75) Inventor: Yoshinori Ishikawa, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 792 days.

(21) Appl. No.: 11/641,764

(22) Filed: Dec. 20, 2006

(65) Prior Publication Data

US 2007/0274167 A1 Nov. 29, 2007

(30) Foreign Application Priority Data

May 23, 2006 (JP) ............... 2006-142229

(51) Int. Cl.
*G11B 7/00* (2006.01)
(52) U.S. Cl. .................. 369/44.32; 369/53.28
(58) Field of Classification Search ............. None
See application file for complete search history.

(56) References Cited

U.S. PATENT DOCUMENTS

| | | | | |
|---|---|---|---|---|
| 5,361,246 | A * | 11/1994 | Tominaga | 369/44.32 |
| 5,675,561 | A * | 10/1997 | Yoshioka | 369/44.25 |
| 6,163,512 | A | 12/2000 | Jeun | |
| 6,731,574 | B1 * | 5/2004 | Abe et al. | 369/44.32 |
| 7,212,473 | B2 | 5/2007 | Seo et al. | |
| 7,542,387 | B2 * | 6/2009 | Ishikawa et al. | 369/44.32 |
| 2005/0180276 | A1 * | 8/2005 | Watanabe et al. | 369/44.29 |

FOREIGN PATENT DOCUMENTS

| | | |
|---|---|---|
| CN | 1150685 | 5/1997 |
| CN | 1540642 | 10/2004 |
| JP | 08-185637 | 7/1996 |
| JP | 08-203108 | 8/1996 |

* cited by examiner

*Primary Examiner*—Joseph H Feild
*Assistant Examiner*—Joseph Haley
(74) *Attorney, Agent, or Firm*—Antonelli, Terry, Stout & Kraus, LLP.

(57) ABSTRACT

An object of the present invention is to provide a focus out detecting apparatus which detects focus out with accuracy during reproducing or recording of data from/on an optical disc having a plurality of recording layers. Further, another object of the present invention is to provide an optical disc apparatus in which a recording or reproducing performance of data is improved by use of the focus out detecting apparatus. A focus out detection signal is output when a level of a focus error signal exceeds a first predetermined level, then reflected light quantity from the optical disc becomes lower than a third predetermined level in a predetermined period, and then the level of the focus error signal exceeds a second predetermined level of an opposite polarity to the first predetermined level.

14 Claims, 16 Drawing Sheets

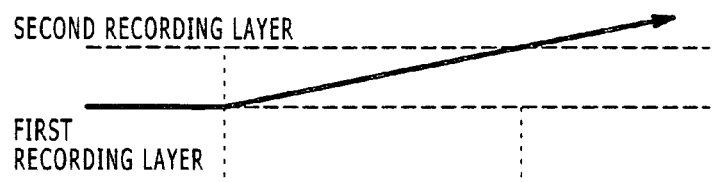
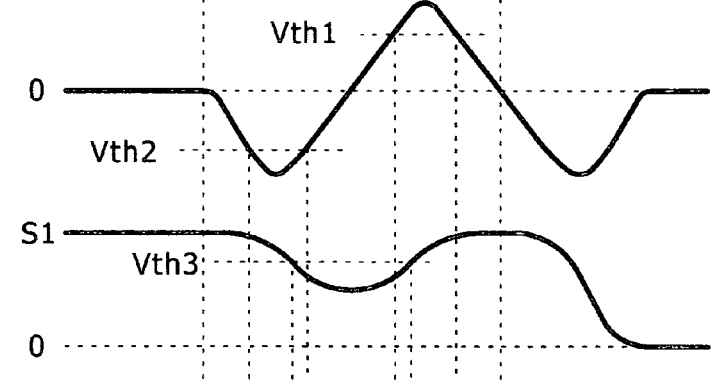
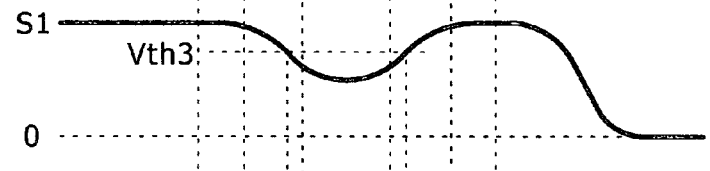
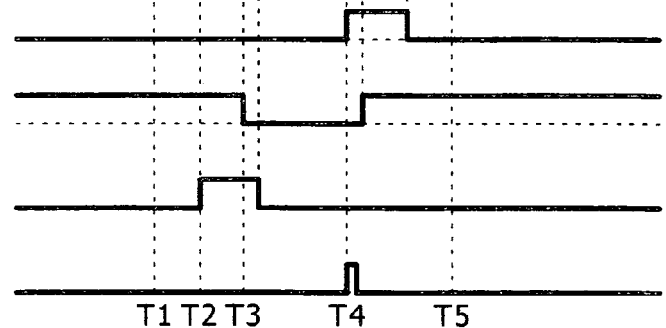

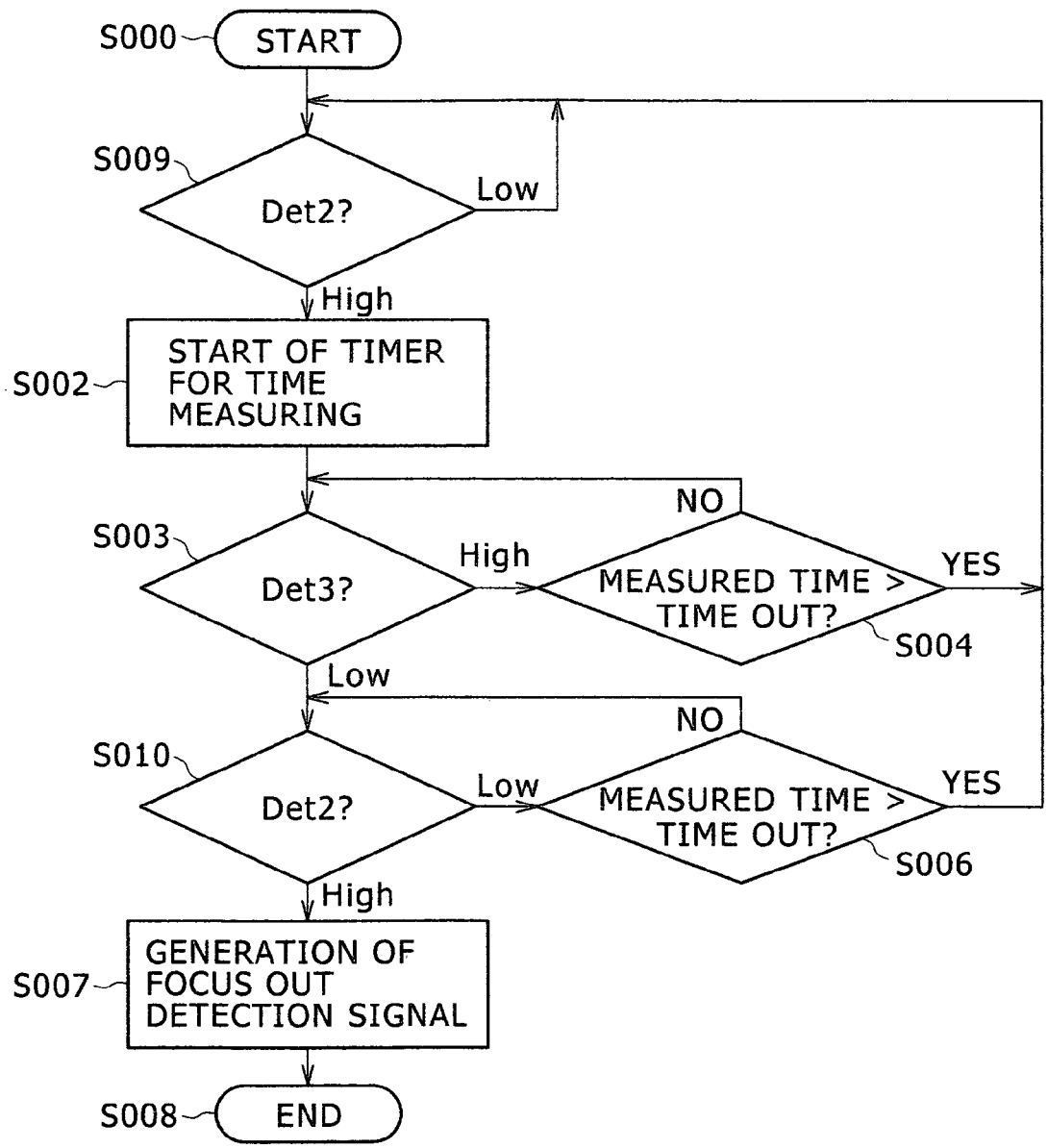

FIG.15
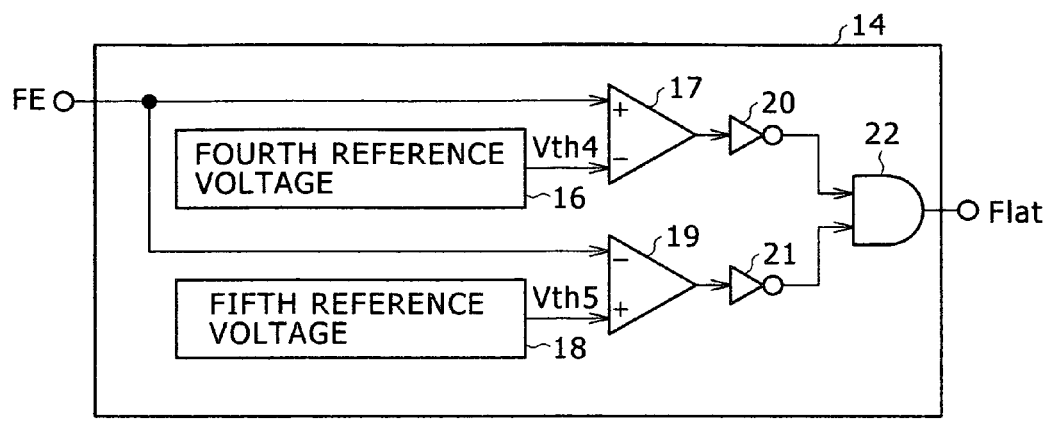
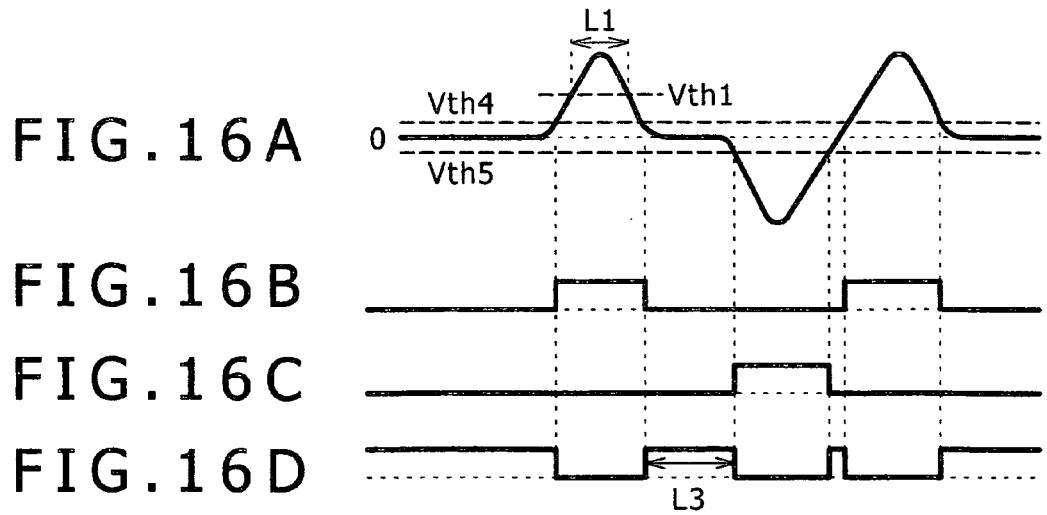
FIG.16A
FIG.16B
FIG.16C
FIG.16D

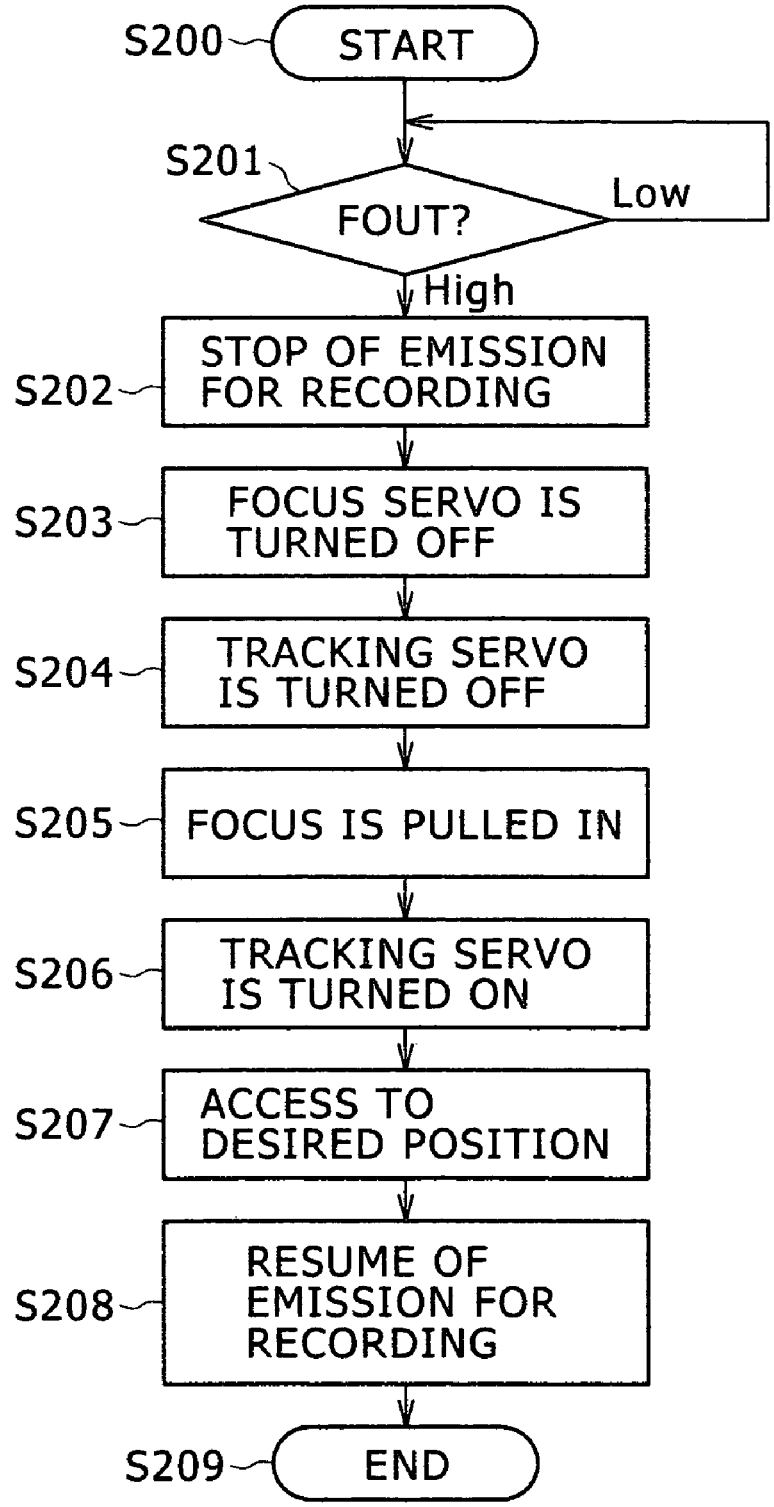

FOCUS OUT DETECTING APPARATUS AND OPTICAL DISC APPARATUS USING THE SAME

CLAIM OF PRIORITY

The present application claims priority from Japanese application serial no. JP 2006-142229, filed on May 23, 2006, the content of which is hereby incorporated by reference into this application.

BACKGROUND OF THE INVENTION (1) Field of the Invention

The present invention relates to a focus out detecting apparatus and an optical disc apparatus using the same.

(2) Description of the Related Art

As a prior art of the present invention, for example, Japanese Patent Application Laid-Open No. 1996-185637 (Patent Document 1) is given. Patent Document 1 discloses "by comparing the level of a focus error signal with a predetermined level of a reference signal, focus out which causes a just-focus on a recording layer different from the one on which data recording or reproducing is being performed is detected".

Further, as another prior art of the present invention, for example, Japanese Patent Application Laid-Open No. 1996-203108 (Patent Document 2) is given. Patent Document 2 discloses "when focus out occurs, a focus error signal of a relatively high level is generated first, and then reflected light quantity per area is decreased. By paying attention to this, a focus actuator is driven in such a manner that an objective lens is moved apart from a disc surface when detecting that the reflected light quantity per area is less than a second reference value in a predetermined period after detecting a defocus state during focus servo control".

SUMMARY OF THE INVENTION

A recording-type optical disc having a plurality of recording layers has been recently put into practical use. When a focus servo deviates due to a disturbance factor of some kind such as oscillation from outside during reproducing or recording data from/on the recording-type optical disc, the data reproducing or recording cannot be performed. Accordingly, when an optical disc apparatus detects the focus out, the data reproducing or recording is temporarily halted, and then the focus servo and a tracking servo are turned on again, thus continuing the data reproducing or recording from the position where the data reproducing or recording is temporarily halted.

As a method of detecting the focus out, for example, Patent Document 1 discloses a method in which a focus error signal (hereinafter, referred to as FE signal) is compared with a predetermined threshold. The method of detecting the focus out disclosed in Patent Document 1 is a method for detecting the waveform of the FE signal that fluctuates between positive and negative levels with respect to a reference level at the time of the focus out, by use of positive and negative thresholds.

Incidentally, a recording surface is required to be manufactured in a flat manner with accuracy in an optical disc manufacturing process. However, unintentional minute distortions are locally present on the recording layers of a part of the completed optical discs in some cases.

There is a case where the same waveform as that at the time of the focus out is generated in the FE signal depending on a distortion shape on the recording layer. Therefore, in the case where the method disclosed in Patent Document 1 is utilized, the fluctuation of the FE signal due to the minute distortion on the recording layer is wrongly detected as that due to the focus out, which results in an unnecessary recording halt or an unnecessary reproducing halt. Thus, a problem arises in that the data recording time or data reproducing time increases.

Further, as a method of allowing an objective lens to move apart from the disc by instantly detecting the occurrence of the focus out, for example, Patent Document 2 discloses a method in which when the level of the FE signal exceeds a predetermined value and the reflected light quantity per area is less than a reference value in a predetermined period, the objective lens is forcibly moved apart from the disc. According to the method of detecting the focus out disclosed in Patent Document 2, in the case where flaws are present near the minute distortion on the recording layer of the optical disc, there is a case where the FE signal largely fluctuates due to the minute distortion, and then the reflected light quantity per area is lowered less than a reference value depending on the positional relation between the distortion and the flaw. Such a case is wrongly detected as focus out, which results in an unnecessary recording halt or an unnecessary reproducing halt. Thus, a problem arises in that the data recording time or data reproducing time increases.

The object of the present invention is to provide a focus out detecting apparatus with a high performance and an optical disc apparatus using the same.

The object of the present invention can be achieved by employing the configuration described in claims as an example.

According to the present invention, it is possible to provide a focus out detecting apparatus with a high performance and an optical disc apparatus using the same.

BRIEF DESCRIPTION OF THE DRAWINGS

These and other features, objects and advantages of the present invention will become more apparent from the following description when taken in conjunction with the accompanying drawings wherein:

FIG. 5 is other waveform views explaining an operation in the first embodiment of the present invention;

FIG. 6 is a flowchart showing the first embodiment of the present invention;

FIG. 15 is a block diagram showing a flat detecting circuit according to the fourth embodiment of the present invention;

FIG. 16 is waveform views explaining an operation of the flat detecting circuit according to the fourth embodiment of the present invention;

FIG. 20 is a flowchart showing the fifth embodiment of the present invention;

DESCRIPTION OF THE PREFERRED EMBODIMENTS

Figure 2:
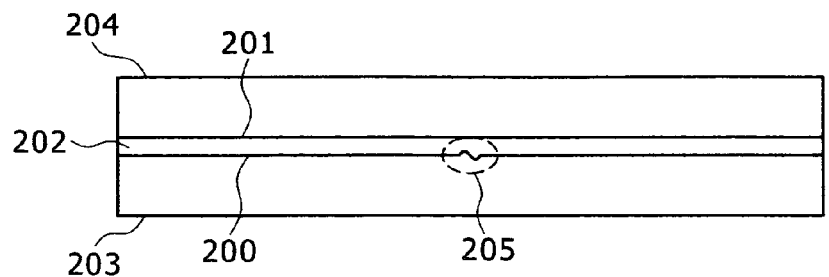
FIG. 2 is a schematic cross sectional view of an optical disc having two recording layers.

The relation between a distortion on a recording surface and an FE signal will be described in detail. FIG. 2 is a cross sectional view of an optical disc having two recording layers. A first recording layer 200 and a second recording layer 201 are composed of a phase-change film, an organic film, and the like, and interpose a transparent space layer 202 therebetween. Further, the optical disc has a configuration in which the recording layers 200 and 201, and the space layer 202 are sandwiched by transparent substrates 203 and 204 formed by use of a transparent material such as polycarbonate. It should be noted that when the optical disc is loaded into an optical disc apparatus, a laser beam by which recording or reproducing of data is performed is irradiated from the side of the transparent substrate 203 toward the first recording layer 200. That is, it should be noted that the surface on the side of the transparent substrate 203 serves as a disc surface, and the surface on the side of the transparent substrate 204 serves as a label surface on which the title of the disc and the like are printed. In FIG. 2, it should be noted that there exists a minute recording-surface-distortion 205 generated in a disc manufacturing process at a portion enclosed by a dotted line on the first recording layer 200.

In the case where the optical disc apparatus performs recording or reproducing of data on/from the first recording layer 200 of the optical disc shown in FIG. 2, when a laser spot for performing the data recording or reproducing passes through the recording surface distortion 205 in a state where a focus servo is steadily operated, the same waveform as that at the time of the focus out is generated in the FE signal depending on the shape of the recording surface distortion 205 in some cases. Therefore, in the case where the method disclosed in Patent Document 1 is utilized, a problem arises in that the fluctuation of the FE signal due to the minute distortion on the recording surface is wrongly detected as the focus out to cause an unnecessary recording halt or an unnecessary reproducing halt, which results in an increase in data recording or reproducing time.

First Embodiment

In the case of an optical disc having a plurality of recording layers, it is conceivable that when a focus servo deviates due to disturbance of some kind and a laser spot moves toward another recording layer, reflected light quantity from the optical disc is temporarily lowered between the recording layers. A focus out detecting apparatus manufactured by focusing attention on the problem will be described below in the first embodiment.

Figure 1:
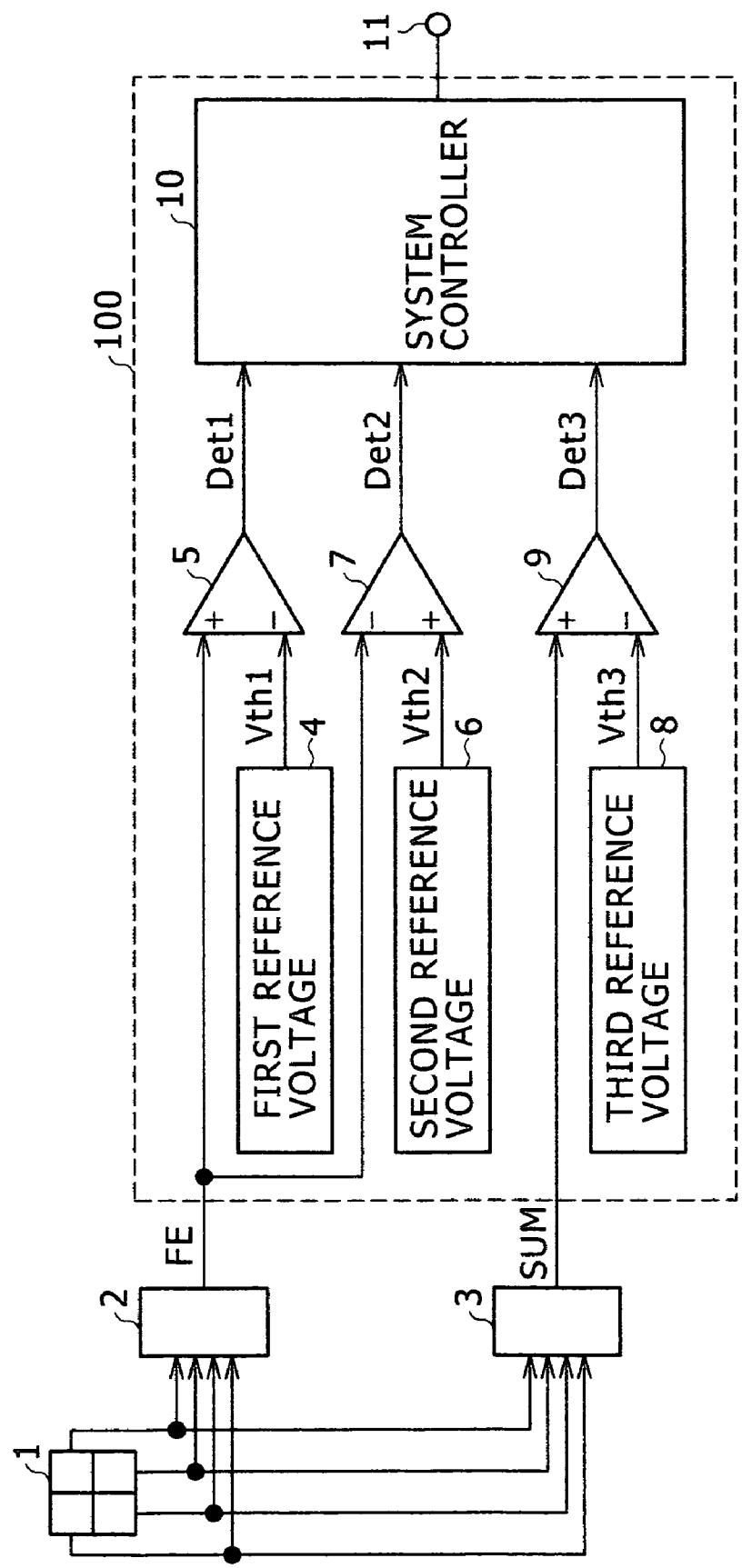
FIG. 1 is a block diagram showing first and second embodiments of the present invention.

Hereinafter, the first embodiment will be described using a block diagram in FIG. 1.

The numeral 1 denotes a quad detector, and respective four photodetectors output electrical signals in accordance with the reflected light quantity from the optical disc.

The numeral 2 denotes a focus error signal generating circuit, which generates the FE signal using the four output signals output from the quad detector by the well-known astigmatic focus error detection, and outputs the same.

The numeral 3 is a sum signal generating circuit, which outputs a signal, as a SUM signal, that is band-limited after computing the sum of the four output signals output from the quad detector. The output spectrum of the sum signal generating circuit 3 is about 100 kHz which corresponds to a signal obtained by averaging the RF signal.

The numeral 4 denotes a first reference voltage, which outputs a voltage Vth1 of a positive level with respect to the reference level of the FE signal.

The numeral 5 denotes a first comparison circuit, the FE signal is input to a noninverted input terminal, and the output voltage Vth1 from the first reference voltage 4 is input to an inverted input terminal. When the level of the FE signal is higher than the first reference voltage Vth1, the first comparison circuit 5 outputs a signal of a high level, but otherwise, outputs a signal of a low level. The output signal from the first comparison circuit 5 is represented as Det1.

The numeral 6 denotes a second reference voltage, which outputs a voltage Vth2 of a negative level with respect to the reference level of the FE signal.

The numeral 7 denotes a second comparison circuit, the FE signal is input to an inverted input terminal, and the output voltage Vth2 from the second reference voltage 6 is input to a noninverted input terminal. When the level of the FE signal is lower than the second reference voltage Vth2, the second comparison circuit 7 outputs a signal of a high level, but otherwise, outputs a signal of a low level. The output signal from the second comparison circuit 7 is represented as Det2.

The numeral 8 denotes a third reference voltage, which outputs a voltage level that falls between the level of the SUM signal at the time the focus servo is off and the level of the SUM signal at the time the focus servo is on. The voltage output from the third reference voltage 8 is represented as Vth3 in the first embodiment.

The numeral 9 denotes a third comparison circuit, the SUM signal is input to a noninverted input terminal, and the output voltage Vth3 from the third reference voltage 8 is input to an inverted input terminal. When the level of the SUM signal is higher than the third reference voltage Vth3, the third comparison circuit 9 outputs a signal of a high level, but otherwise, outputs a signal of a low level. The output signal from the third comparison circuit 9 is represented as Det3.

The numeral 10 denotes a system controller to which the output signal Det1 from the first comparison circuit 5, the output signal Det2 from the second comparison circuit 7, and the output signal Det3 from the third comparison circuit 9 are input. The system controller 10 uses the input signals Det1, Det2, and Det3 to detect focus out in accordance with a sequence, which will be described later, and outputs a focus out detection signal. It should be noted that a general CPU (Central Processing Unit) incorporating a watchdog timer and the like may be used for the system controller 10.

The numeral 11 denotes the focus out detection signal which is output from the system controller 10. Since the quad detector 1, the focus error signal detecting circuit 2, and the sum signal generating circuit 3 are not constituent elements limited to the present invention but the essential constituent elements for the optical disc apparatus, portions relating to the focus out detecting apparatus in the first embodiment are enclosed by a dotted line 100. Respective signal waveforms in the above-described configuration will be shown in FIG. 3.

Figure 3A:
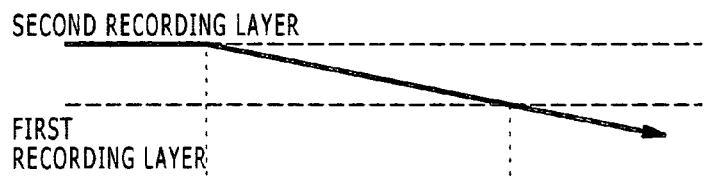
FIG. 3 is waveform views explaining an operation in the first embodiment of the present invention.

FIG. 3A is a schematic diagram in which a locus through which the laser spot for performing recording or reproducing data passes on the optical disc having the first and second recording layers represented by dotted line portions is drawn by a solid line. In the first embodiment, it should be noted that the focus servo deviates due to disturbance of some kind in a state where the laser spot performs recording or reproducing of data on/from the second recording layer, and then the laser spot moves toward the first recording layer. It should be noted that the focus servo deviates at time T1, and the laser spot passes through the first recording layer at time T5 in FIG. 3A.

Figure 3B:
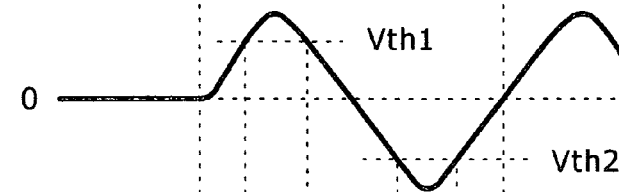

FIG. 3B shows the waveform of the FE signal. The FE signal stays at substantially the reference level (a level of 0 in FIG. 3B) because the focus servo is steadily operated until time T1. However, the level of the FE signal is changed to positive and negative levels during the period from time T1 when the focus servo deviates to time T5 when the focus servo passes through the first recording layer. After passing through the first recording layer at time T5, the FE signal is changed to positive levels, and then converged to a level of 0.

Figure 3C:
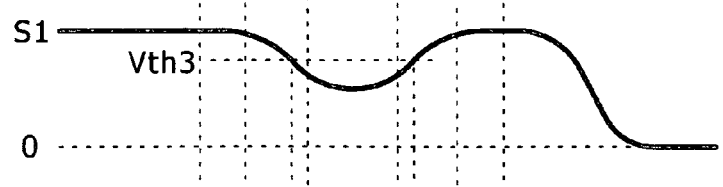

FIG. 3C shows the waveform of the SUM signal. Since the focus servo is on until time T1, a laser beam reflected from the optical disc enters the quad detector 1. Accordingly, the SUM signal shows a level in accordance with the reflected light quantity from the optical disc, so that the level thereof becomes higher than 0. In the first embodiment, the level of the SUM signal when the focus servo is on is represented as S1. When the focus servo deviates at time T1 and the laser spot moves toward the first recording layer, the reflected light quantity from the optical disc is decreased, thus lowering the level of the SUM signal. When the laser spot reaches approximately the middle position between the first and second recording layers, the level of the SUM signal becomes the bottom peak.

As the laser spot further moves to come closer to the first recording layer, the reflected light quantity from the optical disc is increased. Thus, the level of the SUM signal comes closer to S1 again, and then reaches S1 at the time the laser spot passes through the first recording layer at time T5. Then, as the laser spot further moves after time T5 to be apart from the first recording layer, the level of the SUM signal is lowered. When the laser spot sufficiently moves apart from the first recording layer, the reflected light quantity entering the quad detector 1 from the optical disc becomes 0, and thus the level of the SUM signal also becomes 0.

Figure 3D:

FIG. 3D shows the waveform of the output signal Det1 from the first comparison circuit 5. During the period when the level of the FE signal in FIG. 3B is higher than the first reference voltage Vth1, the level of the output signal Det1 becomes high.

Figure 3E:

FIG. 3E shows the waveform of the output signal Det3 from the third comparison circuit 9. During the period when the level of the SUM signal in FIG. 3C is higher than the third reference voltage Vth3, the level of the output signal Det3 becomes high.

Figure 3F:

FIG. 3F shows the waveform of the output signal Det2 from the second comparison circuit 7. During the period when the level of the FE signal in FIG. 3B is lower than the second reference voltage Vth2, the level of the output signal Det2 becomes high.

Figure 3G:

FIG. 3G shows the waveform of the focus out detection signal that is output from the system controller 10. When the focus out is detected in accordance with a sequence to be described below, the system controller outputs a pulse signal of a high level.

Figure 4:
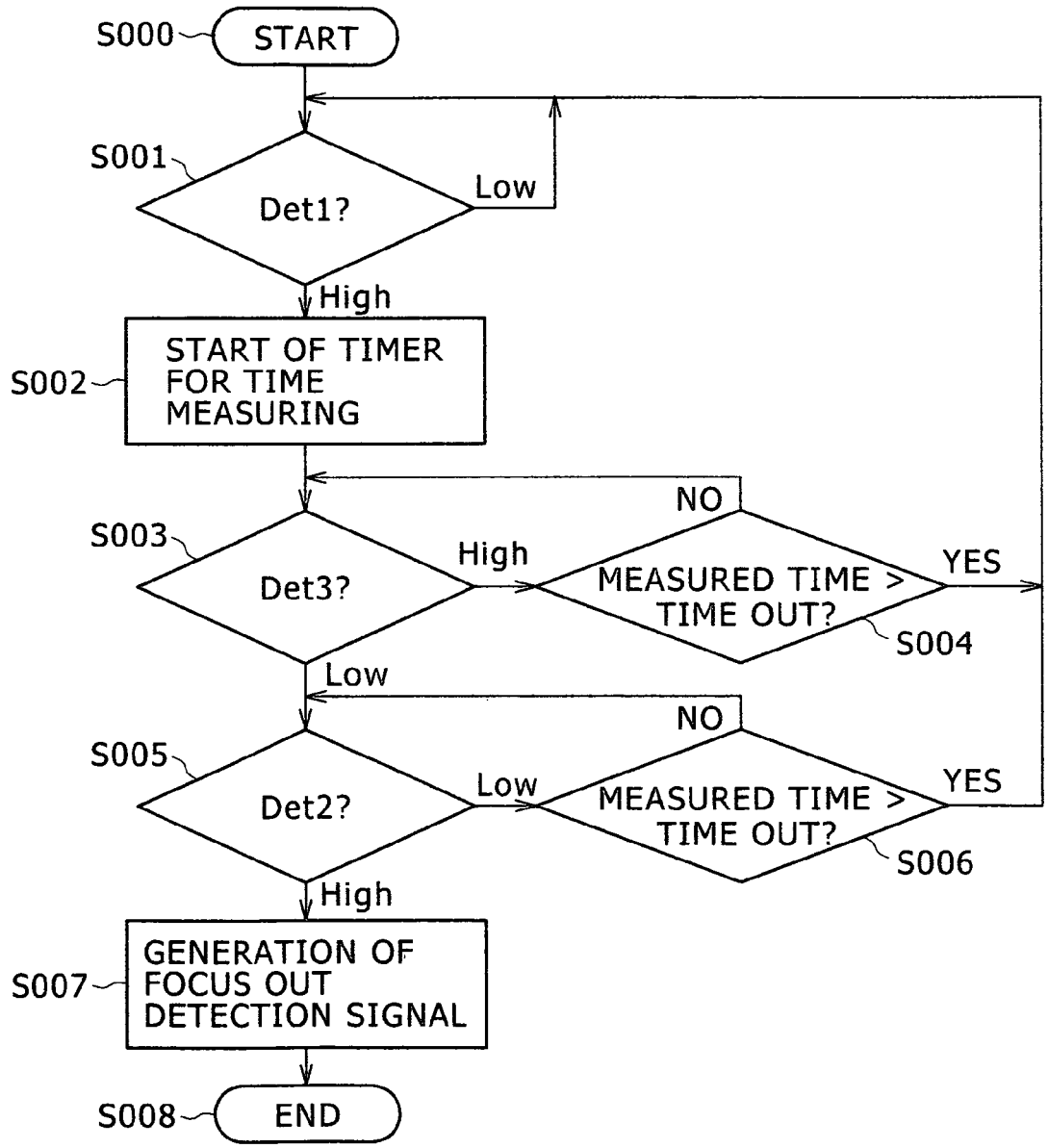
FIG. 4 is a flowchart showing the first embodiment of the present invention.

FIG. 4 is a flowchart showing the sequence to be used by the system controller 10 to detect the focus out.

When the system controller 10 starts to detect the focus out (S000), the level of the output signal Det1 from the first comparison circuit 5 is determined (S001). When the level of the signal Det1 shown in FIG. 3D is low, that is, the level of the FE signal is lower than the first reference voltage Vth1, the flow returns to Step S001.

In a state where the system controller 10 is operated at Step S001, when the level of the signal Det1 in FIG. 3D becomes high at time T2 in FIG. 3, that is, the level of the FE signal becomes higher than the first reference voltage Vth1, the system controller 10 goes through Step S001, and then starts a timer for time measuring (S002). The timer is used for detecting a time-out of the detection of the focus out, and a watchdog timer incorporated in the system controller 10 may be used for the timer.

After the timer is started, the system controller 10 determines the level of the output signal Det3 from the third comparison circuit 9 (S003). When the level of the signal Det3 (FIG. 3E) is high, that is, the level of the SUM signal is higher than the third reference voltage, it is compared whether the measured time is longer than a predetermined time-out period (S004). When the measured time is shorter than the predetermined time-out period, the flow returns to Step S003 to continue determining the level of the signal Det3. On the other hand, when the measured time is longer than the predetermined time-out period, it is determined that the time required for detecting the focus out is over, that is, the fluctuation of the FE signal detected at Step S001 is not caused by the focus out, so that the flow returns to Step S001.

In a state where the system controller 10 is operated between Step S003 and Step S004, when the level of the output signal Det3 (FIG. 3E) from the third comparison circuit 9 is low at time T3 in FIG. 3, that is, the level of the SUM signal is lower than the third reference voltage Vth3, the system controller 10 determines the level of the output signal Det2 from the second comparison circuit 7 (S005).

When the level of the signal Det2 (FIG. 3F) is low at Step S005, that is, the level of the FE signal is higher than the second reference voltage, it is compared whether the measured time is longer than the predetermined time-out period (S006). When the measured time is shorter than the predetermined time-out period, the flow returns to Step S005 to continue determining the level of the signal Det2. On the other hand, when the measured time is longer than the predetermined time-out period, it is determined that the time required for detecting the focus out is over, so that the flow returns to Step S001.

In a state where the system controller 10 is operated between Step S005 and Step S006, when the level of the output signal Det2 (FIG. 3F) from the second comparison circuit 7 is high at time T4 in FIG. 3, that is, the level of the FE signal is lower than the second reference voltage Vth2, the system controller 10 outputs a pulse signal of a high level shown in FIG. 3G as the focus out detection signal (S007), and the flow is terminated (S008).

The above description is an example in the case where the laser spot moves from the second recording layer to the first recording layer at the time the focus servo deviates. However, in the case where the laser spot moves from the first recording layer to the second recording layer in an opposite manner, the changes of the FE signal accordingly become opposite. This case will be described using FIG. 5.

In contrast to FIG. 3, FIG. 5 shows the case where the focus deviates due to disturbance of some kind in a state where data is reproduced or recorded from/on the first recording layer, and the laser spot moves toward the second recording layer. The names of respective waveforms in FIG. 5 are the same as those in FIG. 3.

In this case, when the focus servo deviates at time T1, the polarities of the FE signal in FIG. 5B are changed in an opposite manner to those in the case of FIG. 3. Therefore, the level of the output signal Det2 (FIG. 5F) from the second comparison circuit 7 becomes high at time T2, and the output signal Det1 (FIG. 5D) from the first comparison circuit 5 becomes high at time T4. That is, the time relation of changing timing of the output signals Det1 and Det2 from the first and second comparison circuits is opposite to that in the case of FIG. 3.

On the other hand, it is obvious that the SUM signal in FIG. 5C becomes substantially the same as that in the case of FIG. 3, and therefore the waveform of the output signal Det3 (FIG. 5E) from the third comparison circuit 9 becomes substantially the same as that of the signal Det3 in FIG. 3E.

In this case, the system controller 10 generates the focus out detection signal shown in FIG. 5G in accordance with a flowchart shown in FIG. 6. A point where the flowchart in FIG. 4 differs from that in FIG. 6 is that Steps S001 and S005 in FIG. 4 are replaced by Steps S009 and S010, respectively. It should be noted that operations at the other Steps in FIG. 6 are the same as those in FIG. 4.

In FIG. 6, in place of Step S001 in FIG. 4, the level of the output signal Det2 from the second comparison circuit 7 is determined (S009). When the level of the signal Det2 (FIG. 5F) is low, that is, the level of the FE signal is higher than the second reference voltage Vth2, the flow returns to Step S009. On the other hand, when the level of the signal Det2 (FIG. 5F) is high, that is, the level of the FE signal is lower than the second reference voltage Vth2, the system controller 10 starts the timer for time measuring (S002).

In FIG. 6, in place of Step S005 in FIG. 4, the level of the output signal Det1 from the first comparison circuit 5 is determined (S010). When the level of the signal Det1 (FIG. 5D) is low, that is, the level of the FE signal is lower than the first reference voltage Vth1, the flow proceeds to Step S006. On the other hand, when the level of the signal Det1 (FIG. 5D) is high, that is, the level of the FE signal is higher than the first reference voltage Vth1, the flow proceeds to S007 to output a pulse signal of a high level to the focus out detection signal.

It should be noted that which flowchart shown in FIG. 4 or 6 is used by the system controller 10 is determined in accordance with the layer on which data reproducing or recording is performed. Another system controller (different from the system controller 10 in FIG. 1) mounted in the optical disc apparatus can recognize the layer on which the laser spot is currently located, using address information with which data reproducing or recording is performed. Accordingly, it is only necessary to instruct the system controller 10 in FIG. 1 to use one of the flowcharts shown in FIGS. 4 and 6 in accordance with the layer.

In the focus out detecting apparatus in the first embodiment described above, in addition to the detection of fluctuation between the positive and negative polarities of the FE signal level that is a conventional method, the detection of the level-lowering of the SUM signal indicating the reflected light quantity from the optical disc is added to the condition of the focus out, and thus the affects of the minute flaw on the recording layer of the optical disc can be avoided. Therefore, the accuracy of the detection of the focus out on the two-layered optical disc can be improved.

Second Embodiment

The focus out detecting apparatus for the two-layered optical disc has been described in the above-described first embodiment. A problem of a multi-layered optical disc having three or more recording layers will be described.

Figure 7:
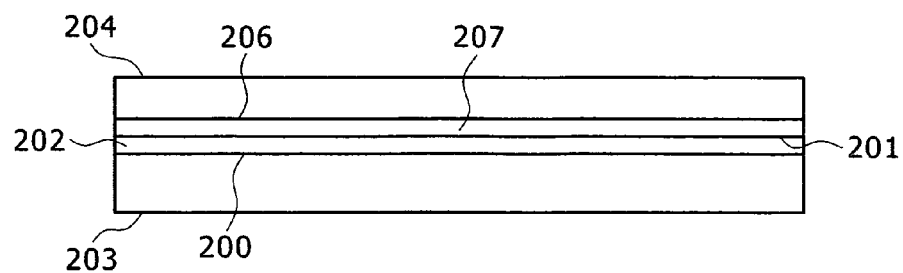
FIG. 7 is a schematic cross sectional view of an optical disc having three recording layers.

FIG. 7 is a cross sectional view of an optical disc having three or more recording layers.

A point where the three-layered optical disc shown in FIG. 7 differs from the two-layered optical disc shown in FIG. 2 is that the three-layered optical disc includes a third recording layer 206 and a second space layer 207. The other constituent elements are the same as those of the two-layered optical disc shown in FIG. 2. It should be noted that the first recording layer is close to an objective lens of the optical disc apparatus, and the third recording layer is close to the side of the label surface of the optical disc.

FIGS. 8 and 9 show the waveforms of the FE signals when the focus servo deviates due to disturbance of some kind at the time data reproducing or recording is performed on the second recording layer 201 of the three-layered optical disc in FIG. 7.

Figure 8A:
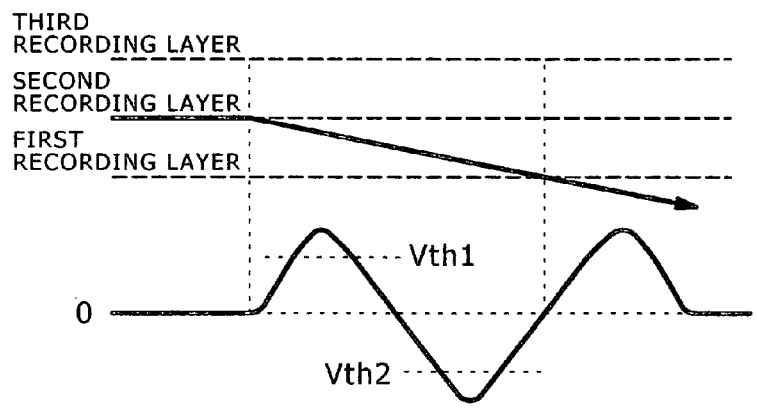
FIG. 8 is waveform views when a focus servo deviates on the optical disc having three recording layers.

FIG. 8A shows a state in which the laser spot moves from the second recording layer toward the first recording layer.

Figure 8B:
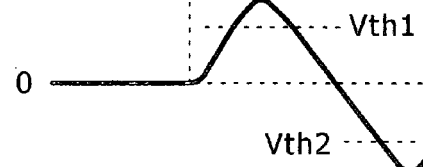

The waveform of the FE signal at this time is shown in FIG. 8B. The level of the FE signal fluctuates in a manner like positive-negative-positive.

Figure 9A:
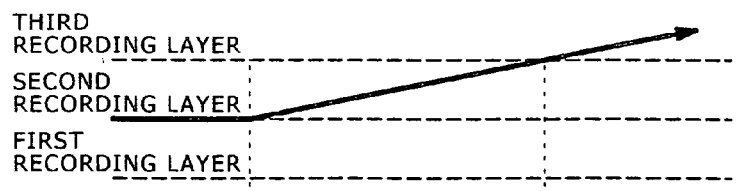
FIG. 9 is other waveform views when the focus servo deviates on the optical disc having three recording layers.

FIG. 9A shows a state in which the laser spot moves from the second recording layer toward the third recording layer.

Figure 9B:
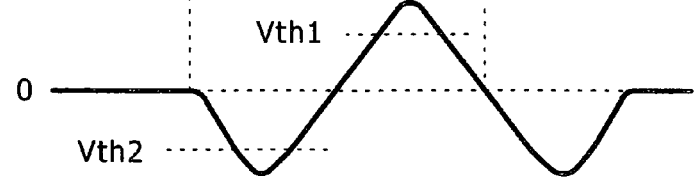

The waveform of the FE signal at this time is shown in FIG. 9B. The level of the FE signal fluctuates in a manner like negative-positive-negative, which is opposite to the FE signal in FIG. 8.

That is, when the focus servo deviates in a state where data reproducing or recording is performed on the second recording layer, changing patterns of the FE signal differ depending on which of the first or third recording layer the laser spot moves toward. Further, which layer the laser spot moves toward is unpredictable when the focus servo deviates. For these reasons, it is impossible to determine which flowchart of FIG. 4 or 6 described in the first embodiment is used for detection of the focus out.

Here, the detection of the focus out that solves the problem will be described. Hereinafter, a sequence used by the system controller 10 to detect the focus out will be described using a flowchart shown in FIG. 10. A block diagram in the second embodiment is the same as that shown in FIG. 1 in the first embodiment, and thus the explanation thereof is omitted.

When the system controller 10 starts to detect the focus out (S000), the level of the output signal Det1 from the first comparison circuit 5 is determined (S011). When the level of the signal Det1 is low, that is, the level of the FE signal is lower than the first reference voltage Vth1, the level of the output signal Det2 from the second comparison circuit 7 is determined (S012). When the level of the signal Det2 is low, that is, the level of the FE signal is higher than the second reference voltage Vth2, the flow returns to Step S011. When the focus servo is on, and is steadily operated, the focus servo is operated between Step S011 and Step S012.

When the level of the signal Det1 is high at Step S011, that is, the level of the FE signal is higher than the first reference voltage Vth1, the system controller 10 sets a DIR flag, which indicates the moving direction of the laser spot, to 1 (S013). The fact that the level of the signal Det1 becomes high earlier than the signal Det2 corresponds to the case of FIG. 3 that was described in the first embodiment. Accordingly, the fact corresponds to the case shown in FIG. 8 that the laser spot moves from the second recording layer toward the first recording layer. For the reason described above, the fact that the DIR flag indicates 1 means that the laser spot moved toward the objective lens of the optical disc apparatus.

Further, when the level of the signal Det2 is high at Step S012, that is, the level of the FE signal is lower than the second reference voltage Vth2, the system controller 10 sets the DIR flag, which indicates the moving direction of the laser spot, to 0 (S014). The fact that the level of the signal Det2 becomes high earlier than the signal Det1 corresponds to the case of FIG. 5 that was described in the first embodiment. Accordingly, the fact corresponds to the case shown in FIG. 9 that the laser spot moved from the second recording layer toward the third recording layer. For the reason described above, the fact that the DIR flag indicates 0 means that the laser spot moves apart from the objective lens of the optical disc apparatus.

Figure 10:
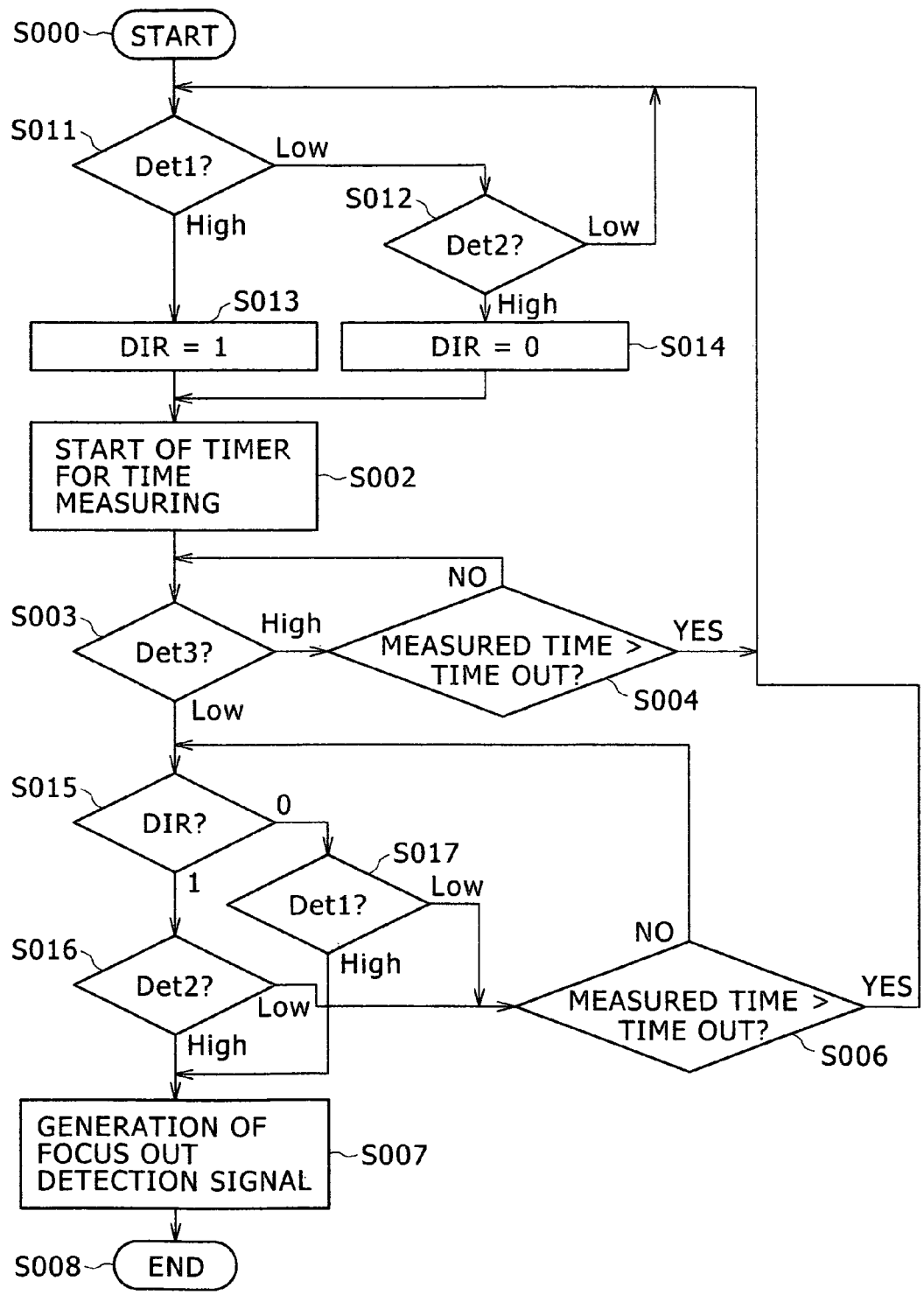
FIG. 10 is a flowchart showing the second embodiment of the present invention.

After setting the DIR flag at Step S013 or Step S014, the system controller 10 starts the timer for time measuring (S002). Step S002 in FIG. 10 is the same as Step S002 in FIG. 4 described in the first embodiment.

After the timer is started, the system controller 10 determines the level of the output signal Det3 from the third comparison circuit 9 (S003). When the level of the signal Det3 is determined as high at Step S003, it is compared whether the measured time is longer than a predetermined time-out period (S004). When the measured time is longer than the predetermined time-out period, it is determined that the time required for detecting the focus out is over, and the flow returns to Step S011. On the other hand, when the measured time is shorter than the predetermined time-out period, the flow returns to Step S003.

When the level of the signal Det3 is determined as low at Step S003, the DIR flag is determined (S015). When the DIR flag is 1 at Step S015, the level of the signal Det2 output from the second comparison circuit 7 is determined (S016). On the other hand, when the DIR flag is 0, the level of the signal Det1 output from the first comparison circuit 5 is determined (S017).

When the level of the signal Det2 is low at Step S016, it is compared whether the measured time is longer than the predetermined time-out period (S006). On the other hand, when the level of the signal Det2 is high, a pulse signal of a high level is output to the focus out detection signal (S007).

When the level of the signal Det1 is low at Step S017, it is compared whether the measured time is longer than the predetermined time-out period (S006). On the other hand, when the level of the signal Det1 is high, a pulse signal of a high level is output to the focus out detection signal (S007).

When the measured time is shorter than the predetermined time-out period at Step S006, the flow returns to Step S015. On the other hand, when the measured time is longer than the predetermined time-out period at Step S006, it is determined that the time required for detecting the focus out is over, and the flow returns to Step S011.

When the system controller 10 outputs the pulse signal of a high level to the focus out detection signal at Step S007, the detection of the focus out is terminated (S008).

In the focus out detecting apparatus in the second embodiment described above, the moving direction of the laser spot is stored using the polarity of the FE signal the level of which is detected first, and the method of detecting the level of the FE signal that is conducted after detecting the lowering of the SUM signal level is switched in accordance with the moving direction that is previously stored. By use of the method, even when the focus servo deviates on the inner recording layer of the optical disc having three recording layers, the focus out can be detected before the laser spot reaches another layer. For example, wrong recording onto an unintentional layer and the like can be prevented. Further, by adding the detection of the lowering of the SUM signal level to the condition of the focus out, the affects of the minute flaw on the recording layer of the optical disc can be avoided, as similar to the first embodiment. Therefore, the accuracy of the detection of the focus out on the three-layered optical disc can be improved.

It should be noted that it is obvious that the focus out detecting apparatus in the second embodiment can be similarly applied to a multi-layered optical disc having two recording layers, or four or more recording layers.

Third Embodiment

If there exist flaws or fingerprints on the surface of the optical disc, the level of the SUM signal is lowered in a spike manner in some cases. When the lowering of the SUM signal level occurs at the position of the minute distortion on the recording layer of the optical disc, the combination of the fluctuation of the FE signal and the lowering of the SUM signal level is wrongly detected as focus out with the sequences of the detection of the focus out described in the first and second embodiments. Thus, there will be described in the third embodiment an example of a focus out detecting apparatus in which the focus out is detected with accuracy while avoiding the affects of the lowering of the SUM signal level due to the flaw on the optical disc.

FIG. 3 shows the signal waveforms at the time of the focus out described in the first embodiment. If a period of a high level of the signal Det1 (FIG. 3D) is assumed as P1 and a period of a low level of the signal Det3 (FIG. 3E) is assumed as P3, absolute values of the period P1 and the period P3 are changed depending on a relative speed between the objective lens and the optical disc at the time the focus servo deviates, but a ratio K of the period P1 to the period P3 becomes substantially constant. In the case of FIG. 5 in which the moving direction of the laser spot at the time of the focus out is opposite, if a period of a high level of the signal Det2 (FIG. 5F) is assumed as P1 and a period of a low level of the signal Det3 (FIG. 5E) is assumed as P3, a ratio of the period P1 to the period P3 becomes the same as the above-described ratio K as similar to the case of FIG. 3.

The ratio K of the periods is determined by the optical design of an optical pickup. The focus out detecting apparatus manufactured by focusing attention on the problem will be described below in the third embodiment.

Figure 11:
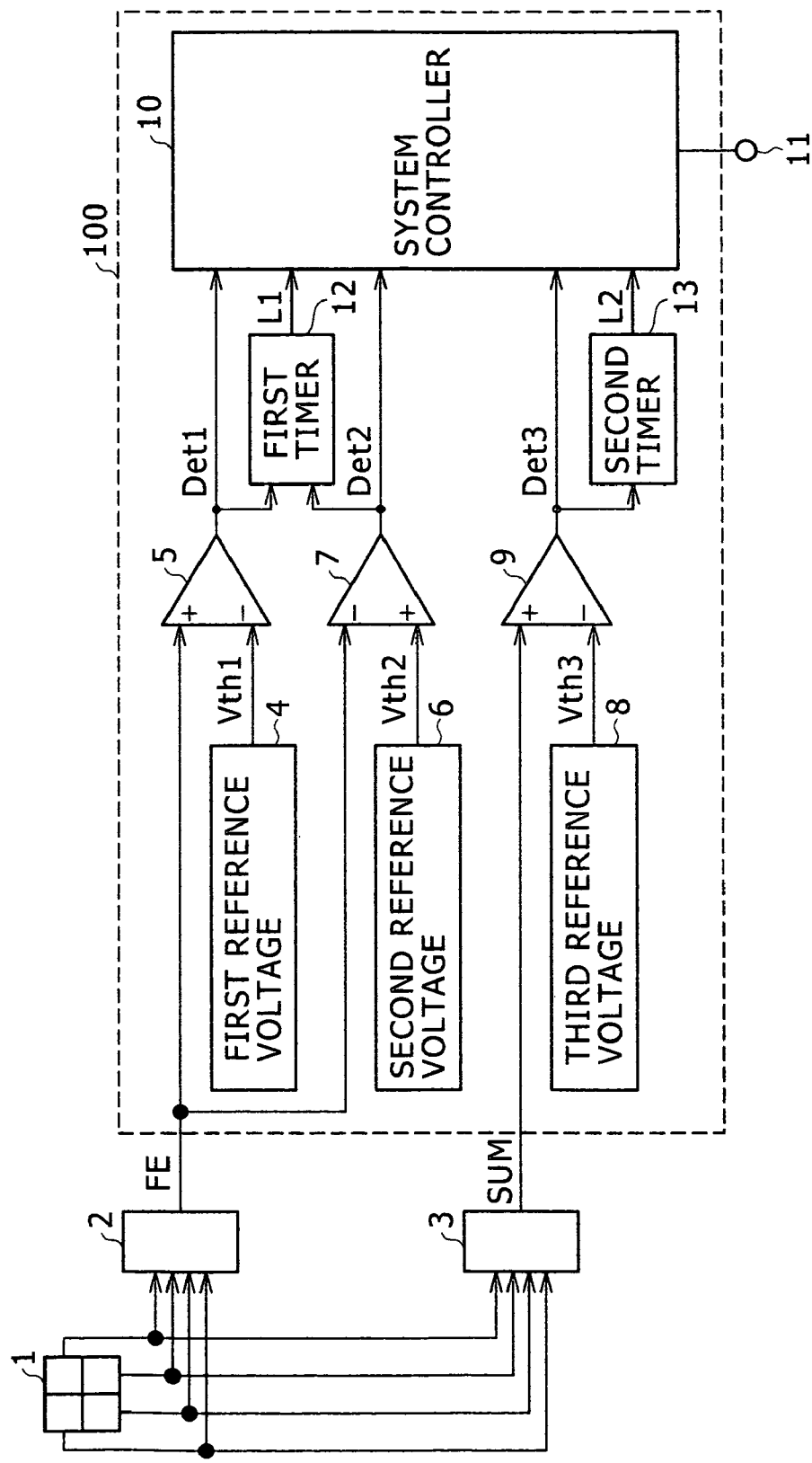
FIG. 11 is a block diagram showing a third embodiment of the present invention.

FIG. 11 is a block diagram showing the third embodiment. A point where the configuration of FIG. 11 differs from that of FIG. 1 that shows the block diagram in the first and second embodiments is that a first timer circuit 12 and a second timer circuit 13 are added. The other constituent elements are given the same numerals and the explanations thereof are omitted.

The signal Det1 output from the first comparison circuit 5 and the signal Det2 output from the second comparison circuit 7 are input to the first timer circuit 12. When either level of the signal Det1 and the signal Det2 becomes high, the first timer circuit 12 starts time measuring from the default 0. The level of the signal that allows the first timer circuit 12 to start becomes low, the time measuring is terminated to hold the final value of the measured time. That is, the first timer circuit 12 performs the time measuring only for a period of a high level of either the Det1 signal or the Det2 signal that becomes a high level first. The measured time performed by the first timer circuit 12 is assumed as L1, and the output signal L1 is input to the system controller 10. The output signal L1 is momentarily changed during the period when the first timer circuit 12 performs the time measuring.

The signal Det3 output from the third comparison circuit 9 is input to the second timer circuit 13. When the level of the signal Det3 becomes low, the second timer circuit 13 starts time measuring from the default 0. When the signal Det3 becomes high, the time measuring is terminated to hold the final value of the measured time. The measured time performed by the second timer circuit 13 is assumed as L2, and the output signal L2 is input to the system controller 10. The output signal L2 is momentarily changed during the period when the second timer circuit 13 performs the time measuring.

Hereinafter, a method of generating a focus out detection signal in the third embodiment will be described using a flowchart in FIG. 12.

Figure 12:
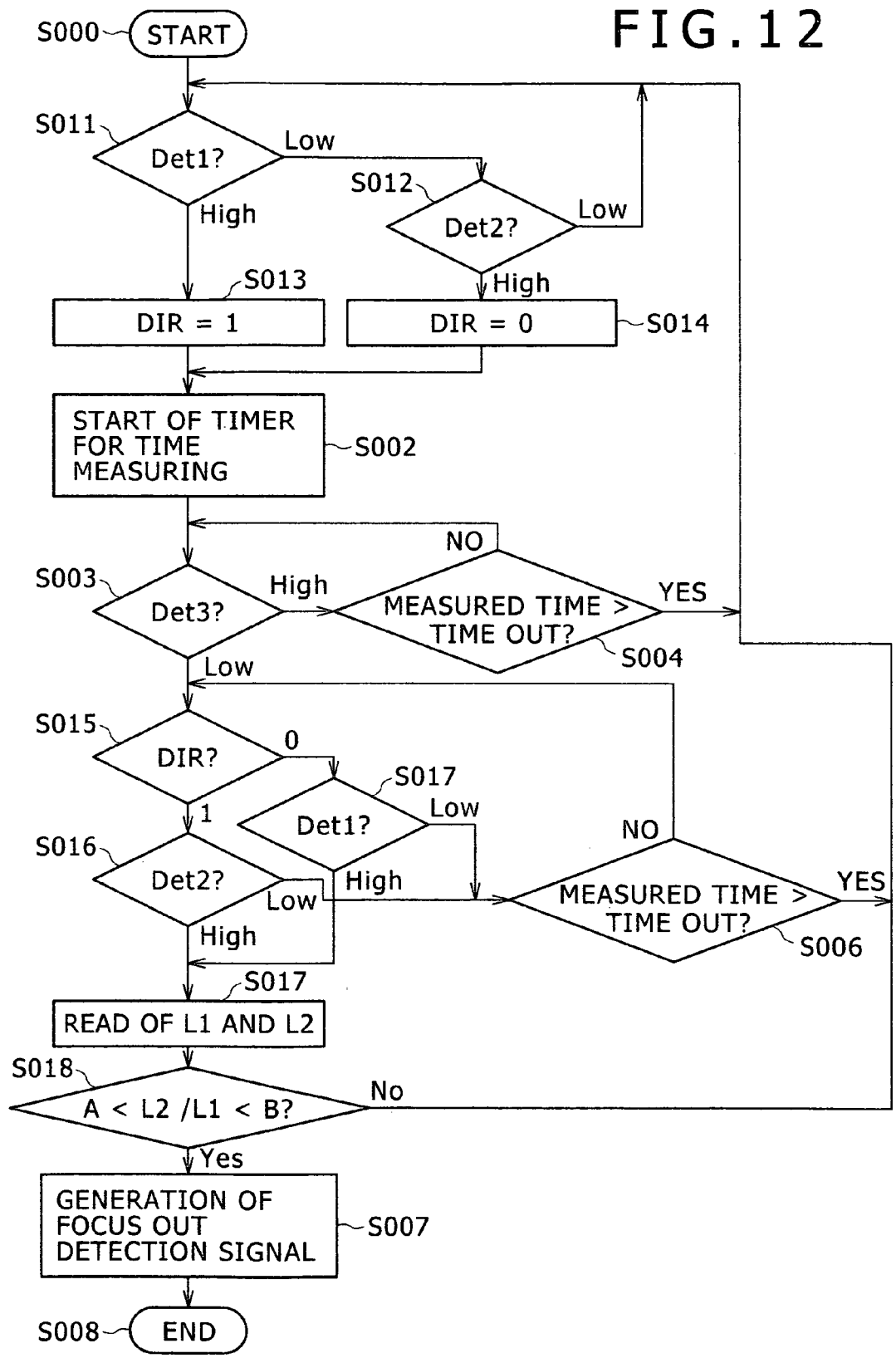
FIG. 12 is a flowchart showing the third embodiment of the present invention.

A point where the flowchart in FIG. 12 differs from that in FIG. 10 in the second embodiment is that Step S017 and Step S018 are added. Processes of the same contents are given the same numerals, and the explanations thereof are omitted.

When the level of the signal Det2 is high at Step S016 in FIG. 12, or the level of the signal Det1 is high at Step S017 in FIG. 12, the output L1 from the first timer circuit 12 and the output L2 from the second timer circuit 13 are read by the system controller 10 (S017).

A ratio L2/L1 of a time L1 to a time L2 is obtained, and it is determined whether the ratio falls within a predetermined range (S018). The time L1 and the time L2 correspond to the period P1 and the period P3 described above, respectively, and accordingly the ratio L2/L1 is supposed to be the constant value K. However, the ratio actually varies every time of an optical pickup in some cases. Thus, a minimum value A and a maximum value B are set, and it is determined whether the ratio falls within the range. Specifically, it is only necessary to set the minimum value A to be about 0.8 times the constant value K and a maximum value B to be about 1.2 times the constant value K.

When the obtained ratio L2/L1 falls out of the predetermined range at Step S018, it is determined that the lowering of the SUM signal level is not caused by the focus out, and the flow returns to Step S011. On the other hand, when the obtained ratio L2/L1 falls within the predetermined range, a pulse signal of a high level is output to the focus out detection signal (S007), and the detection of the focus out is terminated (S008).

In the third embodiment described above, the time L1 when the first fluctuation level of the FE signal exceeds the first reference voltage Vth1 or the second reference voltage Vth2 and the time L2 when the level of the SUM signal becomes lower than the third reference voltage Vth3 are measured to determine whether L1 has a predetermined relation with L2. Thereby, it is discriminated that the lowering of the SUM signal level is caused by either the flaws and fingerprints on the surface of the optical disc or the focus out. Accordingly, even when the minute distortion on the recording layer of the optical disc overlaps with the position of the flaw on the surface of the optical disc, wrong detection of the focus out can be prevented.

Fourth Embodiment

The Blue-ray Disc that has been recently put into practical use improves the data recording density of an optical disc compared to a DVD, by use of blue-violet laser as a laser beam source for performing data recording/reproducing. In the case where an optical system of an optical pickup is designed by use of the blue-violet laser, a range in which the FE signal is changed into a line shape in the vicinity of a just-focus position, that is, a detection range of the FE signal position is narrower compared to a DVD in some cases. The FE signal at this time will be described using FIG. 13.

Figure 13A:
FIG. 13 is waveform views when the focus servo deviates on the optical disc having two recording layers.

FIG. 13A shows a state in which the focus servo deviates in a state where data reproducing or recording is performed on the second recording layer of the optical disc having two recording layers, and the laser spot moves toward the first recording layer. The locus of the laser spot is represented by a solid line in FIG. 13A.

Figure 13B:
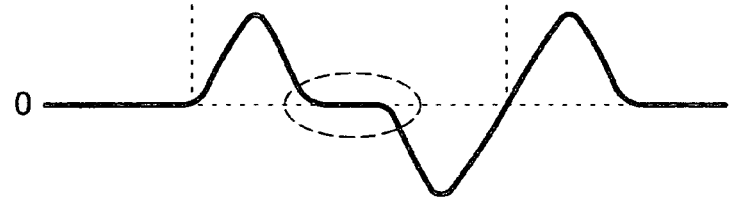

The FE signal at this time is shown in FIG. 13B. In FIG. 13, the detection range of the FE signal is narrow, so that a flat portion enclosed by a dotted-line circle is present in the FE signal in FIG. 13B during the period when the laser spot moves from the second recording layer to the first recording layer.

It is obvious that when the laser spot moves from the first recording layer toward the second recording layer in an opposite manner to FIG. 13, the polarities of the FE signal become opposite to FIG. 13B. However, the flat portion is present in the FE signal between the recording layers as similar to FIG. 13B.

Figure 14:
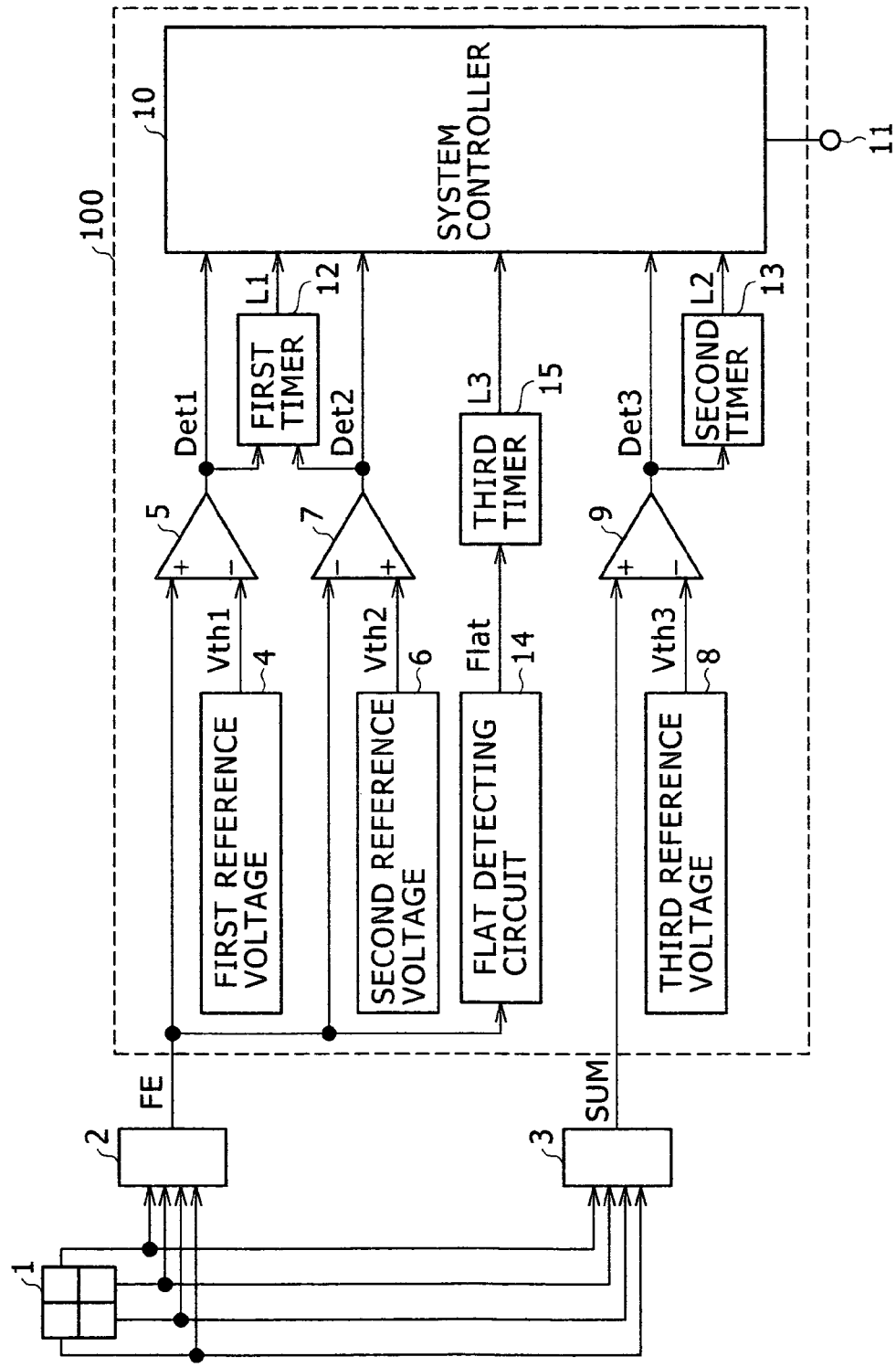
FIG. 14 is a block diagram showing a fourth embodiment of the present invention.

A focus out detecting apparatus manufactured by focusing attention on the flat portion of the FE signal will be described below in the fourth embodiment. FIG. 14 is a block diagram showing the fourth embodiment. A point where the configuration in FIG. 14 differs from the block diagram of FIG. 11 in the third embodiment is that a flat detecting circuit 14 and a third timer circuit 15 are added. The other constituent elements are given the same numerals, and the explanations thereof are omitted.

The FE signal is input to the flat detecting circuit 14, and the flat detecting circuit 14 detects the flat portion of the FE signal to output a detection signal of a high level. The name of the output signal from the flat detecting circuit 14 is represented as Flat. FIG. 15 is a block diagram showing the flat detecting circuit 14 in detail, and the configuration thereof will be described below.

The numeral 16 denotes a fourth reference voltage, which outputs a voltage Vth4 that has a positive level with respect to the reference level of the FE signal.

The numeral 17 denotes a fourth comparison circuit. The FE signal is input to a noninverted input terminal, and the fourth reference voltage Vth4 is input to an inverted input terminal. When the level of the FE signal is higher than the fourth reference voltage Vth4, the fourth comparison circuit outputs a signal of a high level, but otherwise, outputs a signal of a low level.

The numeral 18 denotes a fifth reference voltage, which outputs a voltage Vth5 that has a negative level with respect to the reference level of the FE signal.

The numeral 19 denotes a fifth comparison circuit. The FE signal is input to an inverted input terminal, and the fifth reference voltage Vth5 is input to a noninverted input terminal. When the level of the FE signal is lower than the fifth reference voltage Vth5, the fifth comparison circuit outputs a signal of a high level, but otherwise, outputs a signal of a low level.

The numerals 20 and 21 denote NOT circuits, which invert the output signals from the fourth comparison circuit 17 and the fifth comparison circuit 19.

The numeral 22 denotes an AND circuit, which outputs a logical multiplication of the output signals from the NOT circuits 20 and 21. It should be noted that the output signal from the AND circuit 22 is the Flat signal.

The operation waveforms of the flat detecting circuit 14 in the above-described configuration are shown in FIG. 16.

The waveform in FIG. 16A denotes a waveform of the FE signal, which is the same as that in FIG. 13B.

The waveform in FIG. 16B denotes an output waveform from the fourth comparison circuit 17. When the level of the FE signal is higher than the fourth reference voltage Vth4, the level of the output becomes high.

The waveform in FIG. 16C denotes an output waveform from the fifth comparison circuit 19. When the level of the FE signal is lower than the fifth reference voltage Vth5, the level of the output becomes high.

The waveform in FIG. 16D denotes an output waveform from the AND circuit 22. When the output levels from the fourth and fifth comparison circuits in FIGS. 16B and 16C are low, the level of the output becomes high.

As described above, when the level of the FE signal is a level between the reference voltage Vth4 and the reference voltage Vth5, the level of the output from the AND circuit 22 becomes high, so that the flat detecting circuit 14 can detect that the FE signal is substantially flat.

Here, the period when the level of the FE signal in FIG. 16A becomes higher than the first reference voltage Vth1 is assumed as L1, and the period when the level of the FE signal in FIG. 16A falls between the fourth reference voltage Vth4 and the fifth reference voltage Vth5 between the first and second recording layers is assumed as L3, a ratio of the period L1 to the period L3 becomes a constant value M that is determined by the optical design of an optical pickup.

Here again, the explanation will be continued returning to FIG. 14.

The numeral 15 denotes the third timer circuit. When the level of the Flat signal output from the flat detecting circuit 14 becomes high, the third timer circuit 15 starts time measuring from the default 0. When the level of the Flat signal becomes low, the time measuring is terminated to hold the final value of the measured time. The output signal form the third timer circuit 15 is input to the system controller 10. The measured time output from the third timer circuit 15 is represented as L3. The output signal L3 is momentarily changed during the period when the third timer circuit 15 performs the time measuring.

Hereinafter, a method of generating a focus out detection signal in the fourth embodiment will be described using a flowchart in FIG. 17.

Figure 17:
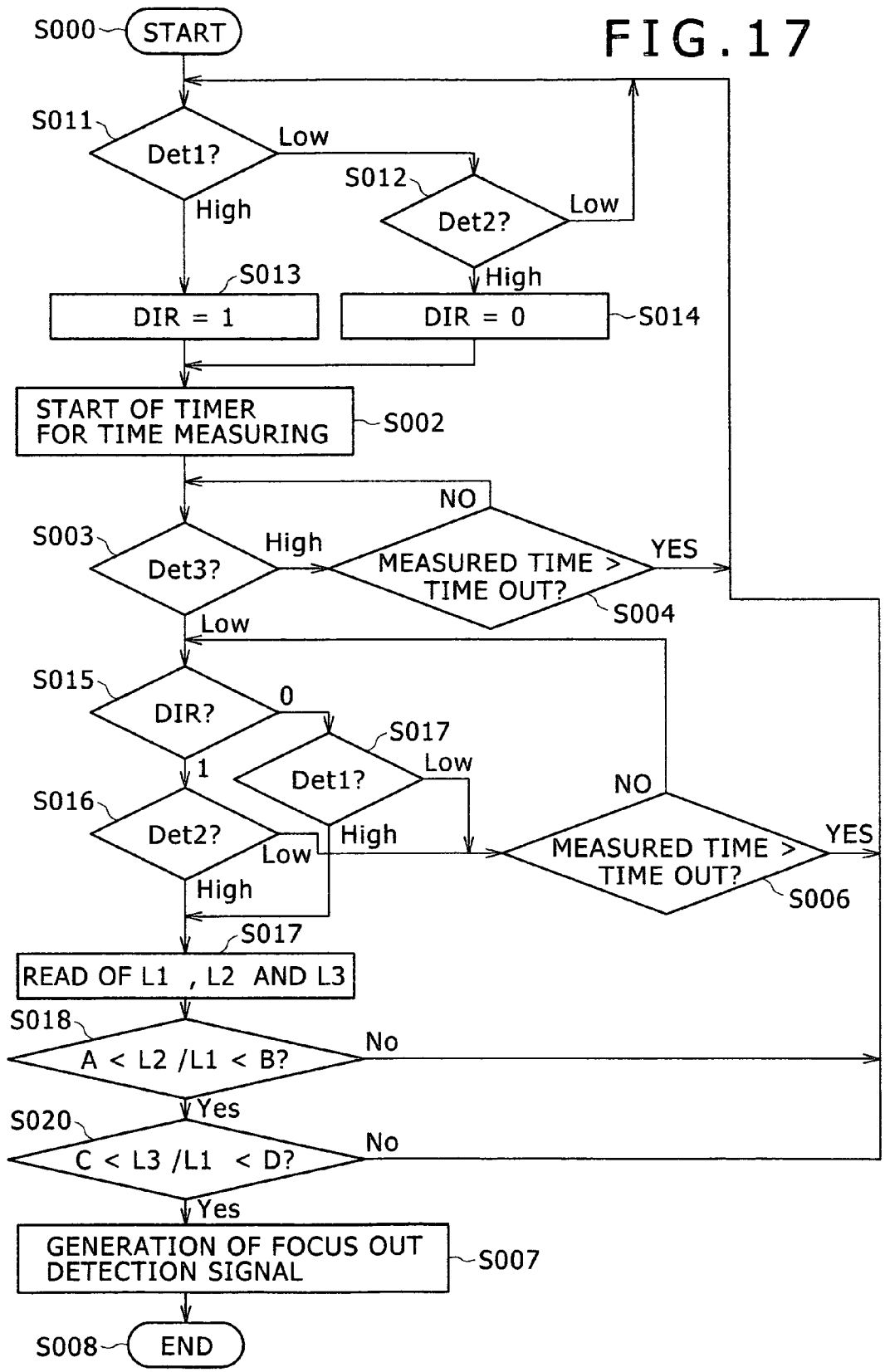
FIG. 17 is a flowchart showing the fourth embodiment of the present invention.

A point where the flowchart in FIG. 17 differs from that in FIG. 12 in the third embodiment is that Step S017 is replaced by Step S019, and Step S020 is added. Processes of the same contents are given the same numerals, and the explanations thereof are omitted.

The system controller 10 reads the measuring times L1, L2, and L3 which are output from the first timer circuit 12, the second timer circuit 13, and the third timer circuit 15, respectively, at Step S019 in FIG. 17.

When a ratio L2/L1 of the measured times falls within a predetermined range at Step S018, a second ratio of L3/L1 of the measured times is obtained to determine whether it falls within the predetermined range (S020). A minimum value C and a maximum value D of the predetermined range will be described later.

When the ratio L3/L1 of the measured times falls out of the predetermined range at Step S020, it is determined that the focus out has not occurred, and the flow returns to Step S011. On the other hand, when the ratio L3/L1 of the measured times falls within the predetermined range, a pulse signal of a high level is output to the focus out detection signal (S007), and the detection of the focus out is terminated (S008).

Figure 18:
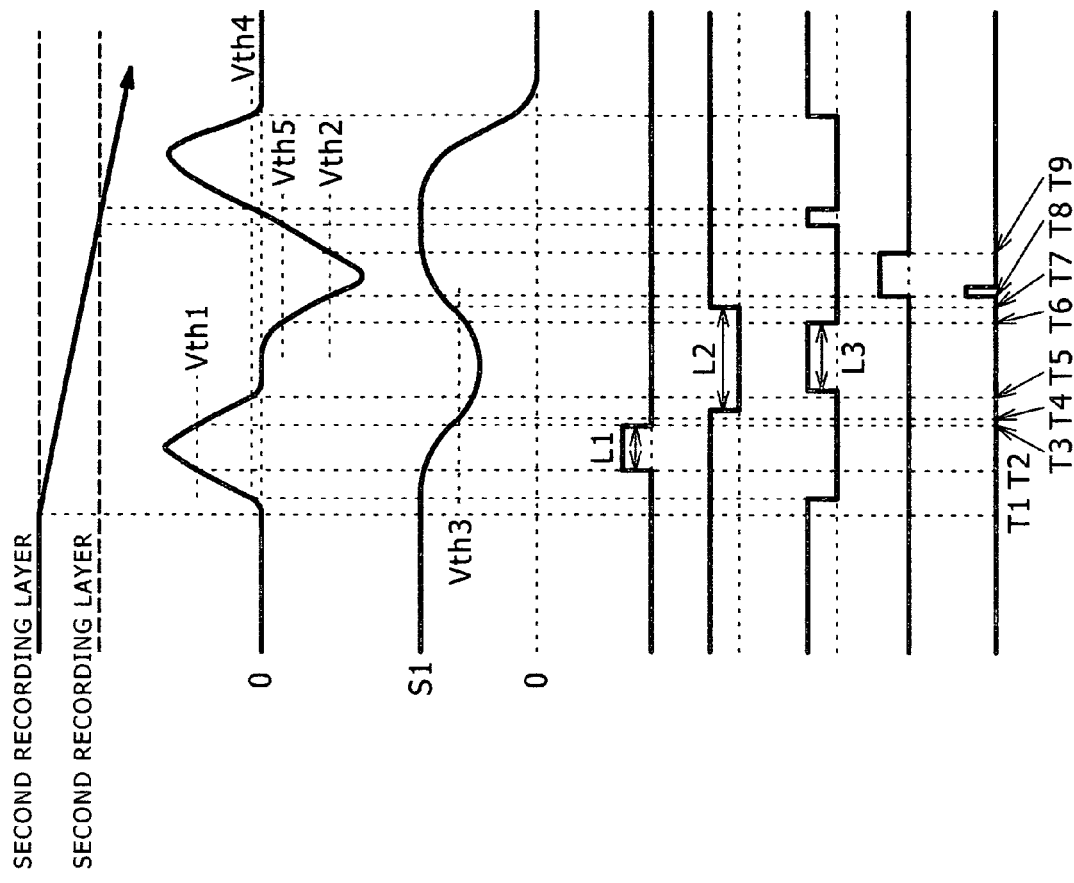
FIG. 18 is waveform views explaining an operation in the fourth embodiment of the present invention.

Here, diagrams of the operation waveforms in the fourth embodiment are shown in FIG. 18.

FIG. 18A shows a state in which the focus servo deviates on the second recording layer at time T1, and the laser spot moves toward the first recording layer.

The waveform in FIG. 18B is of the FE signal, and is the same as that in FIG. 16A.

The waveform in FIG. 18C is of the SUM signal.

The waveform in FIG. 18D is of the output signal Det1 from the first comparison circuit 5, and the level of the signal Det1 becomes high during the period between time T2 and time T3 when the level of the FE signal becomes higher than the first reference voltage Vth1. The L1 read by the system controller 10 at Step S019 in FIG. 17 is a time difference between time T2 and time T3 in FIG. 18.

The waveform in FIG. 18E is of the output signal Det3 from the third comparison circuit 7, and the level of the signal Det3 becomes low during the period between time T4 and time T7 when the level of the SUM signal in FIG. 18C becomes lower than the third reference voltage Vth3. The L2 read by the system controller 10 at Step S019 in FIG. 17 is a time difference between time T4 and time T7 in FIG. 18.

The waveform in FIG. 18F is of the Flat signal output from the flat detecting circuit 14, and the level of the Flat signal becomes high during the period when the level of the FE signal is between the fourth reference voltage Vth4 and the fifth reference voltage Vth5. The L3 read by the system controller 10 at Step S019 in FIG. 17 is a time difference between time T5 and time T6 in FIG. 18.

The waveform in FIG. 18G is of the signal Det2 output from the second comparison circuit 7, and the level of the signal Det2 becomes high during the period between time T8 and time T9 when the level of the FE signal becomes lower than the second reference voltage Vth2.

The waveform in FIG. 18H is of the focus out detection signal output from the system controller 10.

The ratio L3/L1 of the measured times at Step S020 in FIG. 17 is supposed to be the constant value M that is determined by the optical design of an optical pickup as described in FIG. 16. However, the ratio actually varies every time of an optical pickup in some cases. Thus, the minimum value C and the maximum value D are set, and it is determined whether the ratio falls within the range. Specifically, it is only necessary to set the minimum value C to be about 0.8 times the constant value M and the maximum value D to be about 1.2 times the constant value M.

In the above-described fourth embodiment, the following point is added to the third embodiment.

It is determined whether the time L1 when the first fluctuation level of the FE signal exceeds the first reference voltage Vth1 or the second reference voltage Vth2 has a predetermined relation with the time L3 when the level of the FE signal is flat between the recording layers, and accordingly, the accuracy of the detection of the focus out can be improved in an optical pickup having a narrow detection range of the FE signal.

Fifth Embodiment

Figure 19:
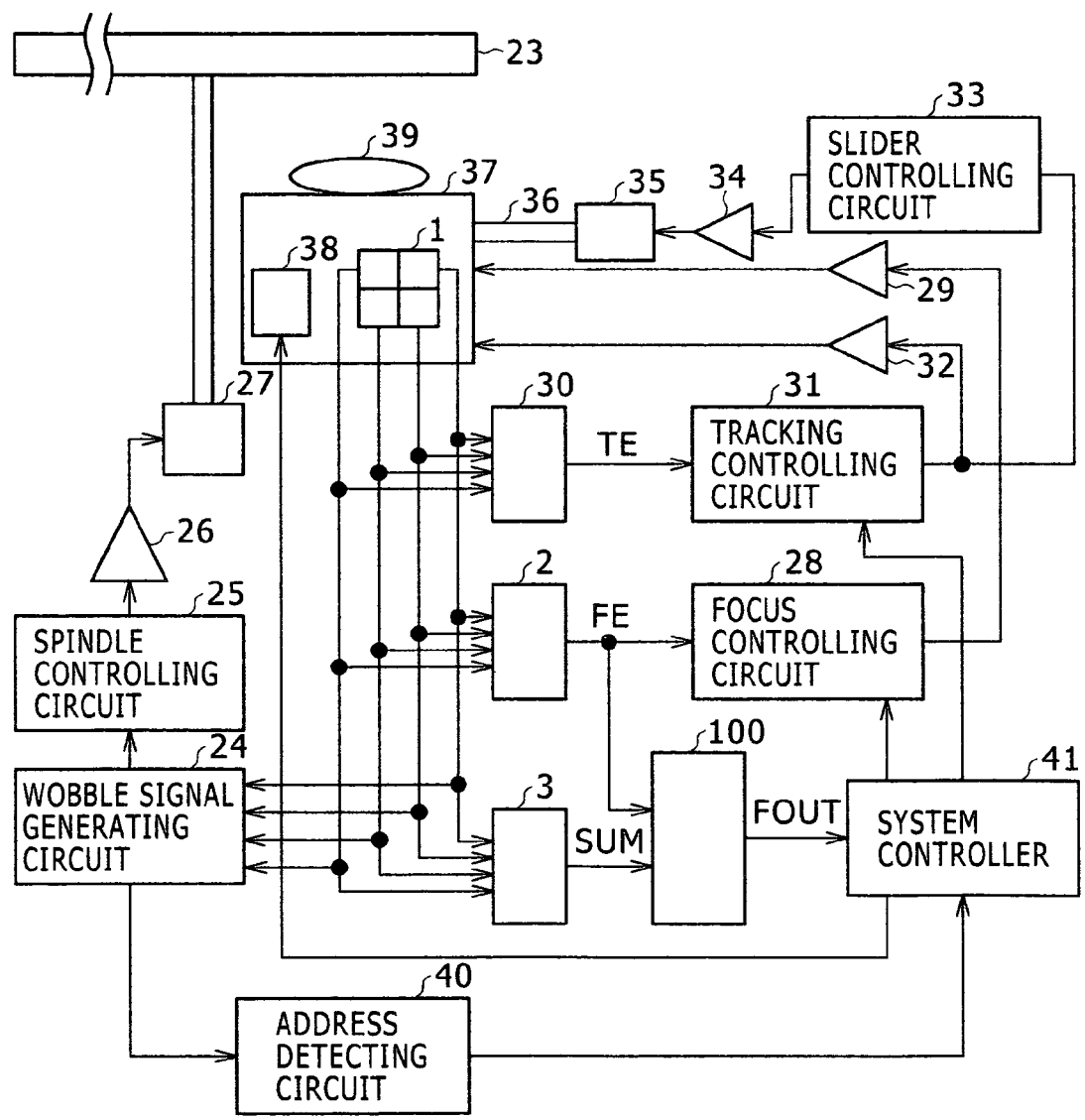
FIG. 19 is a block diagram showing a fifth embodiment of the present invention.

An optical disc apparatus in which one of the first to fourth embodiments is employed is shown in FIG. 19. Hereinafter, the configuration of FIG. 19 will be described.

The numeral 1 denotes a quad detector.

The numeral 2 denotes a focus error signal generating circuit.

The numeral 3 denotes a sum signal generating circuit.

The numeral 100 denotes one of the focus out detecting apparatuses described in the first to fourth embodiments, and a focus out signal output from the focus out detecting apparatus 100 is represented as FOUT.

The constituent elements of the numerals 1 to 3, and the numeral 100 are the same as those in the first to fourth embodiments, and therefore the explanation thereof are omitted.

The numeral 23 denotes an optical disc having a plurality of recording layers, and the tracks of the recording layers have a land/groove structure in a groove shape and are formed in a meander shape with a predetermined length in the rotation direction. The meander formed in the track is referred to as a wobble. Address information of the optical disc is recorded in the wobble by phase modulation.

The numeral 24 denotes a wobble signal generating circuit and a wobble signal that detects wobble elements from respective outputs of the quad detector 1 is supplied to an address detecting circuit 40. Further, the wobble signal generating circuit 24 supplies a wobble carrier signal that detects carrier elements of the wobble signal to a spindle controlling circuit 25.

The numeral 25 denotes the spindle controlling circuit, which generates and outputs a spindle controlling signal in such a manner that the frequency of the wobble carrier signal output from the wobble signal generating circuit 24 is made constant. The length of the wobble formed on the track is constant, and therefore the optical disc 23 is rotated at CLV (Constant Linear Velocity) by controlling the cycle of the wobble carrier signal to be constant.

The numeral 26 denotes a first driver circuit, which generates and outputs a spindle driving signal obtained by amplifying the spindle controlling signal output from the spindle controlling circuit 25.

The numeral 27 denotes a spindle motor, which allows the optical disc 23 to be rotated in accordance with the spindle driving signal output from the first driver circuit 26.

The numeral 28 denotes a focus controlling circuit, which generates and outputs a focus controlling signal obtained by compensating the FE signal for the gain and phase. The focus controlling circuit 28 switches on/off of the focus servo in accordance with an instruction issued from a system controller 41. Further, the focus controlling circuit 28 includes a focus jump signal generating circuit (not shown), which performs a focus jump by which the laser spot is moved to a target recording layer in accordance with an instruction issued from the system controller 41. Furthermore, the focus controlling circuit 28 includes a sweep signal generating unit, which allows an objective lens 39 to operate at a constant speed in the up and down directions, and which allows the objective lens 39 to perform a sweep operation in accordance with an instruction issued from the system controller 41 to turn on the focus servo at a just-focus position, so that the focus can be pulled in.

The numeral 29 denotes a second driver circuit, which outputs the focus driving signal obtained by amplifying the focus controlling signal output from the focus controlling circuit 28.

The numeral 30 denotes a tracking error signal generating circuit, which generates a tracking error signal (hereinafter, referred to as a TE signal) from respective outputs of the quad detector 1 by use of the well-known push-pull method, and outputs the same.

The numeral 31 denotes a tracking controlling circuit, which generates and outputs a tracking controlling signal obtained by compensating the TE signal for the gain and phase. The tracking controlling circuit 31 switches on/off of a tracking servo in accordance with an instruction issued from the system controller 41. Further, the tracking controlling circuit 31 includes a track jump signal generating circuit (not shown), which performs a track jump by which the laser spot is moved to a target track in accordance with an instruction issued from the system controller 41.

The numeral 32 denotes a third driver circuit, which outputs a tracking driving signal obtained by amplifying the tracking controlling signal output from the tracking controlling circuit 31.

The numeral 33 denotes a slider controlling circuit, which extracts low-frequency elements of the tracking controlling signal output from the tracking controlling circuit 30, and generates and outputs a slider controlling signal in which the gain and phase are compensated.

The numeral 34 denotes a fourth driver circuit, which outputs a slider driving signal obtained by amplifying the slider controlling signal output from the slider controlling circuit 33.

The numeral 35 denotes a slider motor, which is rotated in accordance with the slider driving signal output from the fourth driver circuit 34.

The numeral 36 denotes a lead screw, which is coupled to the slider motor 35 and which is rotated in accordance with the movement of the slider motor 35.

The numeral 37 denotes an optical pickup, which incorporates the quad detector 1, a laser diode driver 38, a focus actuator (not shown), a tracking actuator (not shown), and a laser diode (not shown). Further, the optical pickup 37 is coupled to the lead screw 36, and moves in the inner or outer circumference direction of the optical disc 23 in accordance with the rotation of the lead screw 36.

The numeral 38 denotes a laser diode driver, which outputs a driving signal for allowing a laser diode in the optical pickup 37 to emit light.

The numeral 39 denotes the objective lens, which condenses a laser beam emitted by the laser diode in the optical pickup 37 on the recording surface of the optical disc 23. Further, the objective lens 39 can move substantially in the optical axis direction of the laser beam by the focus actuator in the optical pickup 37. Furthermore, the objective lens 39 can move substantially in the radius direction of the optical disc 23 by the tracking actuator in the optical pickup 37.

The numeral 40 denotes an address detecting circuit, which detects address information of the optical disc 23 from the wobble signal output from the wobble signal generating circuit 24.

The numeral 41 denotes the system controller, which controls the operations of the focus controlling circuit 28 and the tracking controlling circuit 31, and at the same time, controls the light-emission waveform of the laser diode driver 38. Further, the system controller 41 can obtain address information of the optical disc 23 on the basis of address information output from the address detecting circuit 40. Furthermore, the focus out detection signal FOUT output from the focus out detecting apparatus 100 is supplied to the system controller 41.

There will be described an operation at the time the optical disc apparatus having the above-described configuration detects the focus out, by use of a flowchart in FIG. 20.

It should be noted that the optical disc 23 is rotated at CLV in such a manner that the cycle of the wobble carrier signal output from the wobble signal generating circuit 24 is made constant, and the focus servo, the tracking servo, and the slider servo are on and steadily operated.

In this state, the system controller 41 issues an instruction of emission for recording to the laser diode driver 38 to start data recording on the optical disc 23, and at the same time, to start monitoring of the focus out detection signal (S200).

The system controller 41 monitors the level of the signal FOUT output from the focus out detecting apparatus 100 (S201).

When the level of the signal FOUT is low at step S201, the system controller 41 continues monitoring of the signal FOUT.

On the other hand, when the focus servo deviates due to disturbance of some kind, a pulse signal of a high level is output to the signal FOUT by the operations described in the first to fourth embodiments. When the system controller 41 detects the high-level pulse signal of the signal FOUT, the system controller 41 instantly instructs the laser diode driver 38 to stop the emission for recording and then to lower the emission power (S202). It should be noted that the emission power is lowered to the level of the reproducing power in the fifth embodiment. Alternatively, the system controller 41 may turn off the laser emission.

Further, the system controller 41 turns off the focus servo (S203), and the tracking servo as well (S204).

Thereafter, the system controller 41 pulls in the focus servo again as a retry process (S205). It is obvious that when the system controller 41 turns off the laser emission at Step S202, the system controller 41 turns on the laser emission before pulling in the focus servo.

The system controller 41 further turns on the tracking servo (S206), and accesses a desired address position (S207). The desired address is an address at which data recording is resumed. An address right after stopping the data recording is generally set as the resume address of the data recording. However, in the case of an optical disc in which an alternation area is prepared in the inner circumference or outer circumference of the optical disc, the address of the alternation area may be set as the resume address.

When the system controller 41 reaches the address at which the data recording is resumed, the emission for recording is resumed (S208), and the flow is terminated (S209).

In the above-described optical disc apparatus in the fifth embodiment, when the focus out is detected during data recording, the emission power of the laser diode is instantly lowered to the reproducing level. Therefore, it is possible to prevent the data from being wrongly recorded on another recording layer, thus providing an optical disc apparatus with high reliability.

Further, as described in the first to fourth embodiments, in the focus out detecting apparatus 100, it is possible to prevent the wrong detection of the focus out due to the affects of the minute distortion on the recording surface of the optical disc and the flaw on the surface of the optical disc, so that an unnecessary recording halt can be prevented. That is, it is possible to prevent the recording time from increasing due to the wrong detection of the focus out, thus improving the recording performance of the optical disc.

In the fifth embodiment, the operations at the time of data recording are described. However, it is obvious that the fifth embodiment can be applied to operations at the time of data reproducing except for Step S202 in FIG. 20. In this case, it is possible to prevent the reproducing time from increasing due to the wrong detection of the focus out, thus improving the reproducing performance of the optical disc.

In FIG. 19, the system controller 41 is provided as a constituent element different from the system controller 10 in the focus out detecting apparatus 100. However, the system controller 41 and the system controller 10 are used as one system controller.

As described above, it is possible to prevent the wrong detection of the focus out due to the minute distortion on the recording surface. Further, it is possible to provide the optical disc apparatus in which the data reproducing or recording time is prevented from increasing by use of the focus out detecting apparatus.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A focus out detecting apparatus which detects focus out of a laser beam condensed on an optical disc that has a plurality of recording layers, wherein the focus out detection apparatus outputs a focus out detection signal when firstly a level of a focus error signal exceeds a first level, when secondly a reflected light quantity from the optical disc becomes lower than a predetermined level in a predetermined period or the focus error signal becomes flat around a level of 0 in a predetermined period, and when thirdly the level of the focus error signal exceeds a second level of an opposite polarity to the first level.

2. An optical disc apparatus which comprises the focus out detecting apparatus according to claim 1, wherein there is provided a controlling unit which interrupts recording or reproducing of data when the focus out detection signal is output.

3. A focus out detecting apparatus which detects focus out on an optical disc that has a plurality of recording layers, comprising:

a light detecting module which outputs electrical signals in accordance with reflected light from the optical disc;

a focus error signal generating module which generates a focus error signal by use of the outputs from the light detecting module;

a reflected-light-quantity sum signal generating module which generates a reflected-light-quantity sum signal indicating a sum of a reflected light quantity from the optical disc by use of the outputs from the light detecting module;

a first comparison module which detects that the level of the focus error signal exceeds a first predetermined value;

a second comparison module which detects that the level of the focus error signal exceeds a second predetermined value of an opposite polarity to the first predetermined value; and a third comparison module which compares the reflected-light-quantity sum signal with a third predetermined value, wherein a focus out detection signal is output when the second comparison module outputs a signal indicating that the level of the focus error signal exceeds the second predetermined value after the third comparison module outputs a signal indicating that the level of the reflected-light-quantity sum signal is lower than the third predetermined value in a predetermined period after the first comparison module outputs a signal indicating that the level of the focus error signal exceeds the first predetermined value, or when the first comparison module outputs a signal indicating that the level of the focus error signal exceeds the first predetermined value after the third comparison module outputs a signal indicating that the level of the reflected-light-quantity sum signal is lower than the third predetermined value in a predetermined period after the second comparison module outputs a signal indicating that the level of the focus error signal exceeds the second predetermined value.

4. A focus out detecting apparatus which detects focus out on an optical disc that has a plurality of recording layers, comprising:

a light detecting module which outputs electrical signals in accordance with reflected light from the optical disc;

a focus error signal generating module which generates a focus error signal by use of the outputs from the light detecting module;

a reflected-light-quantity sum signal generating module which generates a reflected-light-quantity sum signal indicating a sum of a reflected light quantity from the optical disc by use of the outputs from the light detecting module;

a first comparison module which detects that the level of the focus error signal exceeds a first predetermined value;

a second comparison module which detects that the level of the focus error signal exceeds a second predetermined value of an opposite polarity to the first predetermined value;

a third comparison module which compares the reflected-light-quantity sum signal with a third predetermined value;

a storing module which stores which of the first comparison module or the second comparison module outputs first a signal indicating that the focus error signal exceeds the predetermined value;

a first time measuring module which measures, at the time one of the first comparison module and the second comparison module outputs first the signal indicating that the focus error signal exceeds the predetermined value, a period when the one of the first comparison module and the second comparison module outputs that the focus error signal exceeds the predetermined value;

a second time measuring module which measures a period when the third comparison module outputs that the level of the reflected-light-quantity sum signal is lower than the third predetermined value;

a flat detecting module which detects a flat portion of the focus error signal around a level of 0; and a third time measuring module which measures a period when the flat detecting module detects the flat portion of the focus error signal, wherein a focus out detection signal is output when another first comparison module different from the first comparison module stored in the storing module, or another second comparison module different from the second comparison module stored in the storing module outputs that the level of the focus error signal exceeds the predetermined value after the third comparison module outputs a signal indicating that the level of the reflected-light-quantity sum signal is lower than the third predetermined value in a predetermined period after the first comparison module outputs a signal indicating that the level of the focus error signal exceeds the first predetermined value, or in a predetermined period after the second comparison module outputs a signal indicating that the level of the focus error signal exceeds the second predetermined value, in the case where a ratio of the period measured by the first time measuring module to the period measured by the second time measuring module falls within a predetermined range, and a ratio of the period measured by the first time measuring module to the period measured by the third time measuring module falls within a predetermined range.

5. The focus out detecting apparatus according to claim 4, wherein the flat detecting module includes a fourth comparison module which compares the focus error signal with a fourth predetermined value and a fifth comparison module which compares the focus error signal with a fifth predetermined value of an opposite polarity to the fourth predetermined value, and outputs a detection signal as the flat portion when the level of the focus error signal falls between the fourth predetermined value and the fifth predetermined value.

6. An optical disc apparatus which comprises the focus error detecting apparatus according to claim 1,
wherein, when the focus out detecting apparatus outputs a focus out detection signal during recording or reproducing of data on/from an optical disc, a focus servo is pulled in again and the recording or reproducing of data is resumed.

7. An optical disc apparatus which comprises the focus error detecting apparatus according to claim 3,
wherein, when the focus out detecting apparatus outputs a focus out detection signal during recording or reproducing of data on/from an optical disc, a focus servo is pulled in again and the recording or reproducing of data is resumed.

8. An optical disc apparatus which comprises the focus error detecting apparatus according to claim 4,
wherein, when the focus out detecting apparatus outputs a focus out detection signal during recording or reproducing of data on/from an optical disc, a focus servo is pulled in again and the recording or reproducing of data is resumed.

9. An optical disc apparatus which comprises the focus error detecting apparatus according to claim 1,
wherein, when the focus out detecting apparatus outputs a focus out detection signal during recording of data on an optical disc,
emission power of laser is switched to a level lower than recording power,
a focus servo and a tracking servo are turned off,
the focus servo is pulled in again,
an optical pickup is allowed to access a position where the recording of data is resumed, and
the recording of data is resumed.

10. An optical disc apparatus which comprises the focus error detecting apparatus according to claim 3,
wherein, when the focus out detecting apparatus outputs a focus out detection signal during recording of data on an optical disc,
emission power of laser is switched to a level lower than recording power,
a focus servo and a tracking servo are turned off,
the focus servo is pulled in again,
an optical pickup is allowed to access a position where the recording of data is resumed, and
the recording of data is resumed.

11. An optical disc apparatus which comprises the focus error detecting apparatus according to claim 4,
wherein, when the focus out detecting apparatus outputs a focus out detection signal during recording of data on an optical disc,
emission power of laser is switched to a level lower than recording power,
a focus servo and a tracking servo are turned off, the focus servo is pulled in again, an optical pickup is allowed to access a position where the recording of data is resumed, and the recording of data is resumed.

12. An optical disc apparatus which comprises the focus error detecting apparatus according to claim 1, wherein, when the focus out detecting apparatus outputs a focus out detection signal during recording or reproducing of data on/from an optical disc, a focus servo and a tracking servo are turned off, the focus servo is pulled in again, an optical pickup is allowed to access a position where the recording or reproducing of data is resumed, and the recording or reproducing of data is resumed.

13. An optical disc apparatus which comprises the focus error detecting apparatus according to claim 3, wherein, when the focus out detecting apparatus outputs a focus out detection signal during recording or reproducing of data on/from an optical disc, a focus servo and a tracking servo are turned off, the focus servo is pulled in again, an optical pickup is allowed to access a position where the recording or reproducing of data is resumed, and the recording or reproducing of data is resumed.

14. An optical disc apparatus which comprises the focus error detecting apparatus according to claim 4, wherein, when the focus out detecting apparatus outputs a focus out detection signal during recording or reproducing of data on/from an optical disc, a focus servo and a tracking servo are turned off, the focus servo is pulled in again, an optical pickup is allowed to access a position where the recording or reproducing of data is resumed, and the recording or reproducing of data is resumed.

* * * * *